US008001182B2

(12) United States Patent
Ordille et al.

(10) Patent No.: US 8,001,182 B2
(45) Date of Patent: Aug. 16, 2011

(54) METHOD AND APPARATUS FOR DYNAMICALLY ADJUSTING MEMBERSHIP OF A COMMUNICATION FLOW EXPRESSION

(75) Inventors: Joann J. Ordille, South Orange, NJ (US); John Hamilton Slye, Bridgewater, NJ (US); Patrick Tendick, Basking Ridge, NJ (US); David M. Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1131 days.

(21) Appl. No.: 11/083,068

(22) Filed: Mar. 17, 2005

(65) Prior Publication Data
US 2005/0232401 A1   Oct. 20, 2005

Related U.S. Application Data

(60) Provisional application No. 60/554,232, filed on Mar. 18, 2004.

(51) Int. Cl.
*G06F 15/16* (2006.01)
(52) U.S. Cl. .................. 709/204; 709/206; 709/207
(58) Field of Classification Search ............... 709/204, 709/206, 207
See application file for complete search history.

(56) References Cited

U.S. PATENT DOCUMENTS

| 5,892,909 | A | 4/1999 | Grasso et al. | |
| 6,480,885 | B1 * | 11/2002 | Olivier | 709/207 |
| 2002/0116336 | A1 | 8/2002 | Diacakis et al. | |
| 2003/0065874 | A1 * | 4/2003 | Marron et al. | 711/100 |
| 2003/0126250 | A1 * | 7/2003 | Jhanji | 709/223 |

FOREIGN PATENT DOCUMENTS

WO    WO 02/093886 A    11/2002

OTHER PUBLICATIONS

Ordille et al.; Method and Apparatus for Automatic Notification and Response; Nov. 21, 2002; WIPO PCT Publication WO 02/093886 A2.*

Appelman et al.; Prowiding Supplemental Contact Information Corresponding to a Referenced Individual Technical Field; Nov. 27, 2003; WIPO PCT Publication WO 03/098425 A1.*

(Continued)

*Primary Examiner* — Phuoc Nguyen
*Assistant Examiner* — June Sison
(74) *Attorney, Agent, or Firm* — Joseph B. Ryan; Jason Paul DeMont; Wayne S. Breyer

(57) ABSTRACT

Methods and apparatus are provided for dynamically adjusting membership of a communication flow expression in a notification and response system. A message is provided from a sender to at least one recipient in accordance with a communication flow having a plurality of potential paths. The communication flow is controlled by a communication flow expression that contains at least one primitive keyword for dynamically adjusting the at least one recipient. A plurality of the recipients included in the communication flow form an instant focus group. The recipients in the instant focus group can be notified of other recipients in the instant focus group and/or receive the responses of other recipients in the instant focus group. The communication flow expression contains primitive keywords for adding and removing recipients in the communication flow.

20 Claims, 21 Drawing Sheets

OTHER PUBLICATIONS

Frank Vahid, "The Softening of Hardware," Computer, vol. 36, No. 4, pp. 27-34, Apr. 2003, doi:10.1109/MC.2003.1193225.*

Steve McConnell, "Who Needs Software Engineering?," IEEE Software, vol. 18, No. 1, pp. 5-8, Jan./Feb. 2001, doi:10.1109/MS.2001. 903148.*

Andrew Tanenbaum, Structured computer organization; (2nd ed.), Prentice-Hall, Inc., Upper Saddle River, NJ, 1984.*

RFC 3261 "SIP: Session Initiation Protocol" (Jun. 2002) to Rosenberg et al.*

, "EP Application No. 05251633.3 Office Action Oct. 2, 2006" , , Publisher: EPO, Published in: EP.

, "EP Application No. 05251633.3 Office Action Apr. 6, 2006" , , Publisher: EPO, Published in: EP.

* cited by examiner

FIG. 2A

PRIMITIVE TABLE — 200

| OPERATOR | TYPE | BINARY | LIST | RELATED OPERATOR | TRUTH TABLE | EXAMPLE(S) |
|---|---|---|---|---|---|---|
| ADVISES | SEQ. | X | | INFORMS | FIG. 3A | JOHN ADVISES JANE - JOHN'S RESPONSE TRIGGERS NOTIFICATION TO JANE<br><br>JOHN ADVISES BROADCAST {JANE, FRED}- JOHN'S RESPONSE TRIGGERS NOTIFICATION TO JANE AND FRED |
| AFTER | TIME | | | | FIG. 3B | (JOHN RACES JANE) AFTER + 1:00- JOHN AND JANE ARE CONTACTED IN PARALLEL ONE HOUR FROM NOW<br><br><WORK PHONE> AFTER + <WORK HOURS>' 1:00- CONTACT THE USER VIA 'WORK PHONE' AFTER ONE HOUR DURING 'WORK HOURS'<br><br>JOHN AFTER START ('5 MAY 2004') + 10:00- CONTACT JOHN AFTER 10 HOURS ON MAY 5, 2004. IF THE CURRENT TIME IS AFTER 10 AM ON MAY 5, 2004, OR IS ON A DAY AFTER THAT DATE, THEN JOHN IS CONTACTED IMMEDIATELY. |

| OPERATOR | TYPE | BINARY | LIST | RELATED OPERATOR | TRUTH TABLE | EXAMPLE(S) |
|---|---|---|---|---|---|---|
| AND | PAR. | X | X | ANDTHEN | FIG. 3C | JOHN AND JANE - JOHN AND JANE ARE CONTACTED IN PARALLEL, THE FIRST TO RESPOND "NO" CANCELS THE NOTIFICATION TO THE OTHER.<br><br>JOHN AND JANE AND FRED- JOHN, JANE AND FRED ARE CONTACTED IN PARALLEL, THE FIRST TO RESPOND "NO" CANCELS THE NOTIFICATION TO THE OTHERS.<br><br>AND {JOHN, JANE, FRED}- JOHN, JANE AND FRED ARE CONTACTED IN PARALLEL, THE FIRST TO RESPOND "NO" CANCELS THE NOTIFICATION TO THE OTHERS. |
| ANDTHEN | SEQ. | X | X | AND | FIG. 3D | JOHN ANDTHEN JANE- CONTACT JANE IF JOHN SAYS "YES"<br><br>JOHN ANDTHEN JANE ANDTHEN FRED- CONTACT FRED IF JOHN AND JANE SAY "YES"<br><br>ANDTHEN {JOHN, JANE, FRED}- CONTACT FRED IF JOHN AND JANE SAY "YES" |

FIG. 2C

| OPERATOR | TYPE | BINARY | LIST | RELATED OPERATOR | TRUTH TABLE | EXAMPLE(S) |
|---|---|---|---|---|---|---|
| BROADCAST | PAR. | | X | SURVEY | FIG. 3E | BROADCAST {JOHN, JANE, FRED}- CONTACT JOHN, JANE AND FRED IN PARALLEL AND WAIT FOR THEM ALL TO RESPOND<br><br>BROADCAST {JOHN ANDTHEN JANE, FRED}- CONTACT JOHN AND FRED IN PARALLEL, ONLY CONTACT JANE IF JOHN SAYS "YES", WAIT FOR ALL CONTACTED PARTIES TO RESPOND |
| CONSULT | PAR. | | X | | FIG. 3F | CONSULT {JOHN, JANE, FRED}- NOTIFY JOHN, JANE AND FRED, USE THE FIRST RESPONSE AND ALLOW THE OTHERS TO COMMENT. |
| DELEGATES | SEQ. | X | X | RACES | FIG. 3G | JOHN DELEGATES JANE- IF JOHN CAN'T BE REACHED, THEN CONTACT JANE<br><br>JOHN DELEGATES JANE DELEGATES FRED- IF JOHN OR JANE CAN'T BE REACHED, THEN CONTACT FRED<br><br>DELEGATES {JOHN, JANE, FRED}- IF JOHN OR JANE CAN'T BE REACHED, THEN CONTACT FRED |

FIG. 2D

| OPERATOR | TYPE | BINARY | LIST | RELATED OPERATOR | TRUTH TABLE | EXAMPLE(S) |
|---|---|---|---|---|---|---|
| 210 | 220 | 230 | 240 | 250 | 260 | 270 |
| DURING | TIME | | | | FIG. 3H | <WORK TELEPHONE> DURING '<WORK HOURS>'- IF IT IS CURRENTLY WITHIN MY WORK HOURS, THEN CALL ME AT WORK, OTHERWISE WAIT UNTIL IT IS MY WORK HOURS AND THEN PLACE THE CALL.<br><br><HOME TELEPHONE> DURING '4 JUL 2004'- IF IT IS JULY 4th, I'M NOT GOING TO BE AT WORK, SO CALL ME AT HOME.<br><br><CELL PHONE> DURING '<VACATION>'- IF IT IS DURING MY VACATION, CALL ME ON MY CELL PHONE, OTHERWISE WAIT UNTIL IT IS MY VACATION AND CALL ME. IF MY VACATION HAS PASSED BEFORE THE NOTIFICATION, THEN DON'T CALL ME. ONCE I HAVE BEEN CONTACTED, THE CONTACT REMAINS ACTIVE EVEN AFTER MY VACATION HAS ENDED.<br><br>JOHN DURING '08:00'- THIS WOULD BLOCK ALL CONTACT TO JOHN UNTIL 8AM, AT WHICH TIME HE WOULD RECEIVE EVERYTHING. |

FIG. 2E

| OPERATOR | TYPE | BINARY | LIST | RELATED OPERATOR | TRUTH TABLE | EXAMPLE(S) |
|---|---|---|---|---|---|---|
| FROM-TO | TIME | | | | FIG. 3I | \<CELL PHONE\><br>FROM START('\<VACATION\>')<br>TO END('\<VACATION\>') -<br>WHEN MY VACATION HAS STARTED AND NOT YET ENDED, THEN CONTACT ME ON MY 'CELL PHONE'. IF I WAS CONTACTED VIA 'CELL PHONE,' HAVE NOT RESPONDED BEFORE THE END OF MY VACATION, AND MY VACATION ENDS, THEN CANCEL THE NOTIFICATION TO MY 'CELL PHONE' CONTACT. |
| IF-THEN-ELSE | COND. | | | | FIG. 3J | IF JOHN THEN JANE ELSE FRED-<br>IF JOHN SAYS "YES" THEN CONTACT JANE, IF JOHN SAYS "NO" OR CAN'T BE REACHED, CONTACT FRED.<br><br>IF JOHN THEN TRUE ELSE FRED-<br>IF JOHN SAYS "NO" OR CAN'T BE REACHED, CONTACT FRED, OTHERWISE RETURN JOHN'S "YES".<br><br>IF ? LABEL('OUTOFBAND')?<br>THEN \<MAIL\> ELSE \<TELEPHONE\>-<br>IF I RECEIVED THIS REQUEST OUT-OF-BAND, THEN SEND ME EMAIL, OTHERWISE CALL ME. |

| OPERATOR | TYPE | BINARY | LIST | RELATED OPERATOR | TRUTH TABLE | EXAMPLE(S) |
|---|---|---|---|---|---|---|
| INFORMS | PAR. | X | | ADVISES | FIG. 3K | JOHN INFORMS JANE- NOTIFY JOHN AND JANE IN PARALLEL, BUT JANE'S RESPONSE DOES NOT AFFECT THE COMMUNICATION FLOW.<br><br>JOHN INFORMS BROADCAST {JANE, FRED}- NOTIFY JOHN, JANE AND FRED IN PARALLEL, BUT ONLY JOHN'S RESPONSE AFFECTS THE COMMUNICATION FLOW. |
| NOT | NEGATION | | | | FIG. 3L | (NOT JOHN) ANDTHEN JANE- CONTACT JANE ONLY IF JOHN SAYS "NO" |
| OR | PAR. | X | X | ORELSE | FIG. 3M | JOHN OR JANE- CONTACT JOHN AND JANE IN PARALLEL, THE FIRST TO RESPOND "YES" CANCELS THE NOTIFICATION TO THE OTHER.<br><br>JOHN OR JANE OR FRED- CONTACT JOHN, JANE AND FRED IN PARALLEL, THE FIRST TO RESPOND "YES" CANCELS THE NOTIFICATION TO THE OTHERS.<br><br>OR {JOHN, JANE, FRED}- CONTACT JOHN, JANE AND FRED IN PARALLEL, THE FIRST TO RESPOND "YES" CANCELS THE NOTIFICATION TO THE OTHERS. |

FIG. 2G

| OPERATOR | TYPE | BINARY | LIST | RELATED OPERATOR | TRUTH TABLE | EXAMPLE(S) |
|---|---|---|---|---|---|---|
| ORELSE | SEQ. | X | | OR | FIG. 3N | JOHN ORELSE JANE- CONTACT JANE ONLY IF JOHN SAYS "NO"<br><br>JOHN ORELSE JANE ORELSE FRED- CONTACT FRED ONLY IF BOTH JOHN AND JANE SAY "NO"<br><br>ORELSE {JOHN, JANE, FRED}- CONTACT FRED ONLY IF BOTH JOHN AND JANE SAY "NO" |
| POLLS | SEQ. | | X | VOTES | FIG. 3O | {JOHN, JANE, FRED} POLLS 2- JOHN, JANE AND FRED ARE NOTIFIED IN ORDER. AS SOON AS TWO SAY "YES" THE OPERATOR EVALUATES TO TRUE. IF TWO SAY "NO", THEN THE VALUE IS FALSE. IF ONE USER CAN'T BE CONTACTED, ONE ANSWERS "YES" AND THE LAST ANSWERS "NO", THEN MAYBE IS THE RESULT. IF MORE THAN ONE CAN'T BE REACHED, THEN MAYBE IS ALSO THE RESULT.<br><br>{JOHN, JANE, FRED} POLLS 50%- SAME AS PREVIOUS EXAMPLE (50% OF 3 IS 1.5, ROUND TO 2) |

FIG. 2H

| OPERATOR | TYPE | BINARY | LIST | RELATED OPERATOR | TRUTH TABLE | EXAMPLE(S) |
|---|---|---|---|---|---|---|
| RACES | PAR. | X | X | DELEGATES | FIG. 3P | JOHN RACES JANE- JOHN AND JANE ARE CONTACTED IN PARALLEL, THE FIRST TO RESPOND EITHER "YES" OR "NO" CANCELS THE NOTIFICATION TO THE OTHER<br><br>JOHN RACES JANE FRED- JOHN, JANE AND FRED ARE CONTACTED IN PARALLEL, THE FIRST TO RESPOND EITHER "YES" OR "NO" CANCELS THE NOTIFICATION TO THE OTHERS.<br><br>RACES {JOHN, JANE, FRED}- JOHN, JANE AND FRED ARE CONTACTED IN PARALLEL, THE FIRST TO RESPOND EITHER "YES" OR "NO" CANCELS THE NOTIFICATION TO THE OTHERS. |
| SURVEY | SEQ. | | X | BROADCAST | FIG. 3Q | SURVEY {JOHN, JANE, FRED}- CONTACT JOHN, ONCE JOHN HAS RESPONDED, CONTACT JANE, ONCE JANE HAS RESPONDED, CONTACT FRED |
| UNTIL | TIME | | | | FIG. 3R | JOHN UNTIL + 1:00- CONTACT JOHN, IF JOHN HAS NOT RESPONDED WITHIN ONE HOUR, THEN CANCEL THE NOTIFICATION TO JOHN AND INDICATE THAT JOHN COULD NOT BE REACHED. |

FIG. 21

| OPERATOR ⌐210 | TYPE ⌐220 | BINARY ⌐230 | LIST ⌐240 | RELATED OPERATOR ⌐250 | TRUTH TABLE ⌐260 | EXAMPLE(S) ⌐270 |
|---|---|---|---|---|---|---|
| VOTES | PAR. | | X | POLLS | FIG. 3S | {JOHN, JANE, FRED} VOTES 2- CONTACT JOHN, JANE AND FRED IN PARALLEL. AS SOON AS TWO RESPOND "YES", CANCEL THE NOTIFICATION TO THE THIRD AND RETURN TRUE. IF TWO RESPOND "NO", CANCEL THE NOTIFICATION TO THE THIRD AND RETURN FALSE. IF ONE RECIPIENT CAN'T BE REACHED, ONE SAYS "YES" AND ONE SAYS "NO", THEN THIS OPERATOR RESULTS IN A MAYBE. IF MORE THAN ONE USER CAN'T BE REACHED, THEN THE OPERATOR ALSO RESULTS IN A MAYBE.<br><br>{JOHN, JANE, FRED} VOTES 50%- SAME AS PREVIOUS EXAMPLE. |

FIG. 2J

| OPERATOR | TYPE | BINARY | LIST | RELATED OPERATOR | TRUTH TABLE | EXAMPLE(S) |
|---|---|---|---|---|---|---|
| WHEN | COND. | | | | FIG. 3T | WHEN JOHN ISTRUE JANE ISFALSE FALSE ISMAYBE MAYBE- EQUIVALENT TO JOHN ANDTHEN JANE<br><br>WHEN JOHN ISTRUE JANE- EQUIVALENT TO JOHN ANDTHEN JANE<br><br>WHEN JOHN ISMAYBE JANE- EQUIVALENT TO JOHN DELEGATES JANE<br><br>WHEN JOHN ISFALSE JANE- EQUIVALENT TO JOHN ORELSE JANE<br><br>WHEN JOHN ISTRUE JANE ISFALSE FRED ISMAYBE FRED- EQUIVALENT TO IF JOHN THEN JANE ELSE FRED<br><br>WHEN JOHN UNTIL + 1:00<br>    ISMAYBE RACES {JOHN, JANE}<br>    ISFALSE JANE-<br>CONTACT JANE IF JOHN EITHER DOES NOT RESPOND WITHIN ONE HOUR, OR RESPONDS "NO". IF JOHN DOES NOT RESPOND WITHIN AN HOUR, JOHN WILL ALSO BE CONTACTED AGAIN. IF JOHN RESPONDS "YES" AT ANY TIME, THEN THE OPERATOR RESULTS IN TRUE. |

FIG. 3A

| ADVISES | RIGHT | | |
|---|---|---|---|
| | F | X | T |
| LEFT F | F | F | F |
| X | X | X | X |
| T | T | T | T |

FIG. 3B

AFTER TRUTH TABLE

IF THE TIME_EXPRESSION CONTAINS A TIME_DOMAIN THAT IS EMPTY, OR AN ERROR IS GENERATED WHILE EVALUATING THE EXPRESSION, THEN AFTER AUTOMATICALLY RESULTS IN A MAYBE. OTHERWISE, AFTER ALWAYS GENERATES A NORESULT VALUE PRIOR TO THE TIME OF EXECUTION AND THEN REPLACES ITSELF WITH ITS CHILD EXPRESSION WHEN THE TIME IS REACHED.

FIG. 3C

| AND | RIGHT | | |
|---|---|---|---|
| | F | X | T |
| LEFT F | F | F | F |
| X | F | X | X |
| T | F | X | T |

FIG. 3D

| ANDTHEN | RIGHT | | |
|---|---|---|---|
| | F | X | T |
| LEFT F | F | F | F |
| X | X | X | X |
| T | F | X | T |

FIG. 3E

BROADCAST TRUTH TABLE

*BROADCAST* EVALUATES TO *NORESULT* UNTIL ALL OF ITS CHILDREN HAVE EVALUATED TO A TRUTH-VALUE (*TRUE*, *FALSE*, OR *MAYBE*) AND THEN IT EVALUATES TO *TRUE*.

FIG. 3F

CONSULT TRUTH TABLE

*CONSULT* EVALUATES TO *NORESULT* UNTIL ONE OF ITS CHILDREN HAS EVALUATED TO A TRUTH-VALUE OF *TRUE* OR *FALSE*, IT THEN RETURNS THAT RESULT PLACING THE REST OF ITS CHILDREN *OUT-OF-BAND*. IF ALL OF ITS CHILDREN RESULT IN A TRUTH-VALUE OF *MAYBE*, THEN *CONSULT* RESULTS IN *MAYBE*.

FIG. 3G

| DELEGATES | RIGHT | | |
|---|---|---|---|
| | F | X | T |
| LEFT  F | F | F | F |
| X | F | X | T |
| T | T | T | T |

FIG. 3H

DURING TRUTH TABLE

IF *TIME_DOMAIN* IS EMPTY, THERE IS AN ERROR PROCESSING *TIME_DOMAIN*, OR THE CURRENT TIME IS AFTER THE LAST INTERVAL IN THE *TIME_DOMAIN*, THEN *DURING* WILL GENERATE A *MAYBE*. OTHERWISE IT REPLACES ITSELF WITH ITS CHILD EXPRESSION ONCE THE CURRENT TIME IS IN THE TIME DOMAIN AND THE RESULTING VALUE WILL BE THE VALUE FOR THAT EXPRESSION.

FIG. 3I

FROM-TO TRUTH TABLE

IF *TIME_EXPRESSION1* CONTAINS A *TIME_DOMAIN* THAT IS EMPTY OR AN ERROR IS GENERATED WHILE PROCESSING A *TIME_EXPRESSION*, THEN *FROM-TO* AUTOMATICALLY RESULTS IN A *MAYBE*. THIS OPERATOR RESULTS IN A *NORESULT* VALUE AS LONG AS THE *FROM* TIME HAS NOT BEEN REACHED. ONCE EVALUATION OF THE EXPRESSION HAS BEGUN, THEN THE RESULT OF THE EXPRESSION IS RETURNED. IF THE EXPRESSION GENERATES A RESULT OTHER THAN *NORESULT*, THEN THE *TO* TIME IS CANCELED AND THAT VALUE IS USED AS THE VALUE OF THE OPERATOR. IF THE *TO* TIME IS REACHED, THEN THE COMMUNICATION FLOW IS CANCELED AND *MAYBE* IS THE RESULT OF THE OPERATOR.

FIG. 3J

|    |   | THEN/ELSE | | | | | | | | |
|----|---|-----|-----|-----|-----|-----|-----|-----|-----|-----|
|    |   | F/F | F/X | F/T | X/F | X/X | X/T | T/F | T/X | T/T |
|    | F | F | X | T | F | X | T | F | X | T |
| IF | X | F | X | T | F | X | T | F | X | T |
|    | T | F | F | F | X | X | X | T | T | T |

FIG. 3K

INFORMS

| | RIGHT F | RIGHT X | RIGHT T |
|---|---|---|---|
| LEFT F | F | F | T |
| LEFT X | F | X | T |
| LEFT T | X | X | T |

FIG. 3L

| NOT | |
|---|---|
| F | T |
| X | X |
| T | F |

| | RIGHT F | RIGHT X | RIGHT T |
|---|---|---|---|
| LEFT F | F | X | T |
| LEFT X | X | X | T |
| LEFT T | T | T | T |

FIG. 3N

ORELSE

| | RIGHT F | RIGHT X | RIGHT T |
|---|---|---|---|
| LEFT F | F | X | T |
| LEFT X | X | X | T |
| LEFT T | T | T | T |

FIG. 3P

POLLS TRUTH TABLE

|  | | RIGHT | |
|---|---|---|---|
| RACES | F | X | T |
| LEFT F | F | F | F |
| X | F | X | T |
| T | T | T | T |

FIG. 3O

POLLS TRUTH TABLE

POLLS GENERATES A *MAYBE* RESULT IF IT DETERMINES AT ANY TIME THAT IT IS NOT POSSIBLE TO GENERATE A *TRUE* OR *FALSE* WITH THE REMAINING EXPRESSIONS IT HAS TO EVALUATE. IT WILL ALSO EVALUATE TO *TRUE* AS SOON AS THE NUMBER (OR PERCENTAGE) IS REACHED, OR *FALSE* AS SOON AS THERE ARE ENOUGH *FALSE* VALUES TO PREVENT THE EXPRESSION FROM RETURNING *TRUE*.

FIG. 3R

UNTIL TRUTH TABLE

WHEN THE TIME IS REACHED, THE CHILD COMMUNICATION FLOW IS CANCELED AND THIS OPERATOR RESULTS IN A *MAYBE*. IF THE CHILD FLOW COMPLETES WITH A TRUTH-VALUE FIRST, THEN THE *UNTIL* IS CANCELED AND THE CHILD'S TRUTH-VALUE IS PASSED ON AS THE RESULT OF THE OPERATOR.

FIG. 3Q

SURVEY TRUTH TABLE

*SURVEY* EVALUATES TO *NORESULT* UNTIL ALL OF ITS CHILDREN HAVE EVALUATED TO A TRUTH-VALUE (*TRUE, FALSE,* OR *MAYBE*) AND THEN IT EVALUATES TO *TRUE*.

FIG. 3S

VOTES TRUTH TABLE

*VOTES* GENERATES A *MAYBE* RESULT IF IT DETERMINES AT ANY TIME THAT IT IS NOT POSSIBLE TO GENERATE A *TRUE* OR *FALSE* WITH THE REMAINING EXPRESSIONS. IT WILL ALSO EVALUATE TO *TRUE* AS SOON AS THE NUMBER (OR PERCENTAGE) IS REACHED, OR *FALSE* AS SOON AS THERE ARE ENOUGH *FALSE* VALUES TO PREVENT THE EXPRESSION FROM RETURNING *TRUE*.

FIG. 3T

WHEN TRUTH TABLE

THIS OPERATOR CAN BE USED TO CREATE A TRUTH TABLE FOR A NEW SEQUENTIAL "OPERATOR". EACH OF THE LIST OPERATORS WITH A BINARY FORM (*ANDTHEN*, *DELEGATES*, *ORELSE*) CAN BE CREATED WITH THIS OPERATOR, AS WELL AS THE TERNARY OPERATOR *IF-THEN-ELSE*.

FIG. 4

1. ⇧⇩ Subscription 55027102 (Company One High Severity), using [7x24 Profile ▼] Status: [Active ▼]

2. ⇧⇩ Subscription 55027113 (Top Customer High Severity), using [Informational Profile ▼] Status: [Active ▼]

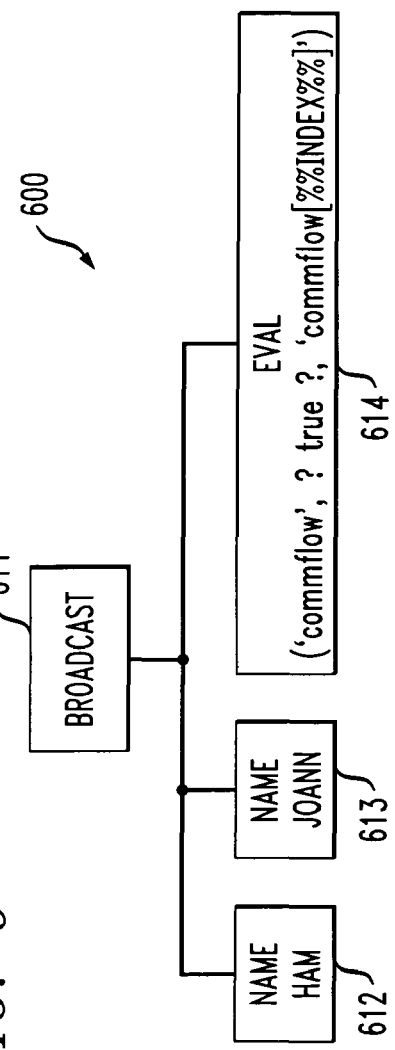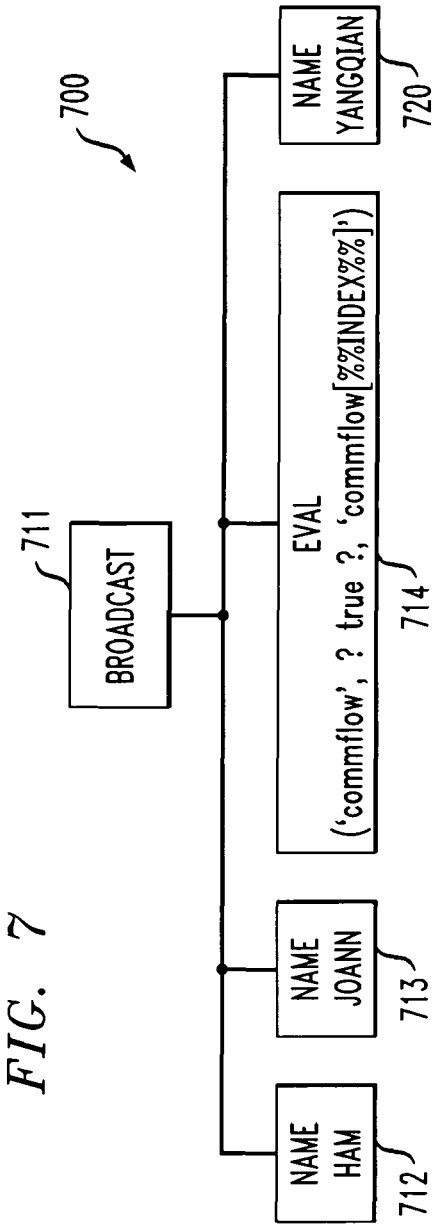

FIG. 8

[ Requests ] [ Company One Outages ] [ Company One Other Majors ]

Previous | Next

"I AM ON A CUSTOMER VISIT."

"I WILL DISPATCH A TECH TO THE SITE RIGHT AWAY."

This request is still pending.
Responses:

| Responder | Date | Submit | Comments | Org | Phone | E-Mail |
|---|---|---|---|---|---|---|
| Joann Ordille | Wed Mar 12, 2003 7:51 AM EST | Yes | Recording | Field Services | +1 908 696-5125 | joann@avaya.com |
| Jerry Ryan | Wed Mar 12, 2003 8:58 AM EST | Watch | I will watch to see the resolution of this case | Sales | +1 908 953-5165 | gwryan@avaya.com |
| Qian Yang | Wed Mar 12, 2003 8:58 AM EST | No | Recording | NSM | +1 908 696-5179 | yangqian@avaya.com |

Requests:
This request was generated on Tue Mar 11, 2003 3:31 PM EST.

| Customer Contact | | Case Manager Contact | |
|---|---|---|---|
| Name | JANE DOE | Name | JOHN AVAYA |
| Email | jane@c1.com | Email | john@avaya.com |
| Phone Number | 8005551212 | Phone Number | 8005551213 |
| Site Location | Company One Development Center (FL #:0005555555) | | |
| Site Address | 40 Company One Road, Townsville, NJ UNITED STATES | | |

| Request | |
|---|---|
| Maestro Case # | 123456 |
| FSAC Ticket # | SW5555555 |
| Subject | G3R Customer Request |
| Category | Company One Major Repair |
| Severity Code | 4 |
| Status | RefFSO |
| Date Reported | Wed Mar 12, 2003 7:37 AM EST |
| Description | Phones are down in the warehouse. Cust requests dpo. |
| Note | For a graphical display of alarm/ticket history, click here. |

Will you take responsibility for this case?

⦿ Yes, I take responsibility for this.
◯ No, I don't take responsibility for this case, but keep me informed.
◯ No, I don't take responsibility for this case, and don't remind me.

SUBSCRIBER AND DELEGATE TABLE

| PROPOSAL ID | SUBSCRIPTION ID MATCHED | DELEGATION ? | RECIPIENTS |
|---|---|---|---|
| 2456 | 53839576 | NO | HAM |
| 2456 | 53839000 | NO | HAM |
| 2517 | 44667890 | PARALLEL | YANGQIAN, JOANN |
| ⋮ | ⋮ | ⋮ | ⋮ |

METHOD AND APPARATUS FOR DYNAMICALLY ADJUSTING MEMBERSHIP OF A COMMUNICATION FLOW EXPRESSION

CROSS REFERENCE TO RELATED APPLICATION

This application claims the benefit of U.S. Provisional Application No. 60/554,232, filed Mar. 18, 2004, and is related to U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," and U.S. patent application Ser. No. 11/083,365, entitled "Method and Apparatus for Automatic Notification and Response Based On Communication Flow Expressions Having Dynamic Context," U.S. patent application Ser. No. 11/083,070, entitled "Method and Apparatus for Just In Time Education," and U.S. patent application Ser. No. 11/083,069, entitled "Method and Apparatus for Subscribing to Dynamic Attributes," each filed contemporaneously herewith, and each incorporated by reference herein.

FIELD OF THE INVENTION

The present invention relates generally to communication methods and systems, and more particularly, to methods and systems that notify one or more users of information.

BACKGROUND OF THE INVENTION

Enterprise applications need to contact people and have requirements for how the contact is done and what responses, if any, are collected. For example, applications may need to contact all people who have certain interests, or a particular list of people or a single person. Applications may need to contact someone immediately in a crisis or they may want to remind someone of a task at an appropriate time. Enterprise applications also have requirements about what to do when the contact is unsuccessful, where success is something defined by the enterprise.

Recipients, on the other hand, have their own preferences about how and when they are contacted. For example, recipients may want particular people, such as a boss or family member, or people who represent particular interests, such as an executive from a Fortune 500 Company, to be given more flexibility in establishing real-time contact. In addition, recipients may routinely delay contact about known tasks, such as weekly status or expense updates, until a convenient time or place. Oftentimes, the preferences of recipients are at odds with the preferences of an enterprise or the implementation of a specific application. In those cases, recipients find creative ways to work around the application constraints, in order to satisfy their preferences, or find the enterprise's processes frustrating or even annoying.

A number of notification systems have been proposed or developed to enable applications to communicate with one or more recipients. U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, "Method and Apparatus for Automatic Notification and Response Based on Communication Flow Expressions," disclose notification and response systems. Generally, the disclosed notification and response systems (i) send requests to one or more recipients, using the medium specified by each individual recipient; (ii) collect and processes responses; and (iii) forward the responses to their final destination by means of the medium specified by the final destination.

While communication flows in such notification and response systems elicit responses from recipients and may follow different paths based on a response, they can only react to responses at the point at which they were elicited or at a subsequent point. In addition, such notification and response systems are unable to dynamically add or remove participants in a communication flow.

A need therefore exists for notification and response systems that can react dynamically to responses in a variety of locations in a communication flow, different from the location that elicited the response. A further need exists for notification and response systems that can react to changes in the data of the request. Yet another need exists for notification and response systems that understand the context of the communication flow execution and make decisions that are context dependent in the communication flow and in the rendering of information to applications.

SUMMARY OF THE INVENTION

Generally, methods and apparatus are provided for dynamically adjusting membership of a communication flow expression in a notification and response system. A message is provided from a sender to at least one recipient in accordance with a communication flow having a plurality of potential paths. The communication flow is controlled by a communication flow expression that contains at least one primitive keyword for dynamically adjusting the at least one recipient.

According to one aspect of the invention, a plurality of the recipients included in the communication flow form an instant focus group. The recipients in the instant focus group can be notified of other recipients in the instant focus group and/or receive the responses of other recipients in the instant focus group. Optionally, an application can selectively enable formation of the instant focus groups and a given recipient can selectively participate in the instant focus group. According to another aspect of the invention, the communication flow expression contains at least one primitive keyword for adding a recipient to the communication flow and at least one primitive keyword for removing a recipient from the communication flow.

A more complete understanding of the present invention, as well as further features and advantages of the present invention, will be obtained by reference to the following detailed description and drawings.

BRIEF DESCRIPTION OF THE DRAWINGS

FIGS. 2A through 2J, collectively, are an operator table that lists a number of exemplary communication flow operators;

FIGS. 3A through 3T illustrate the truth tables for the operators indicated in FIGS. 2A through 2J;

FIG. 4 illustrates an exemplary interface for ordering subscriptions based on labels, in accordance with the present invention;

FIGS. 6 and 7 illustrate an exemplary parse tree and a corresponding modified parse tree for a communication flow expression that contains an eval function;

FIG. 8 is an exemplary user interface that provides a portal to a community of interest responses;

DETAILED DESCRIPTION

Figure 1:
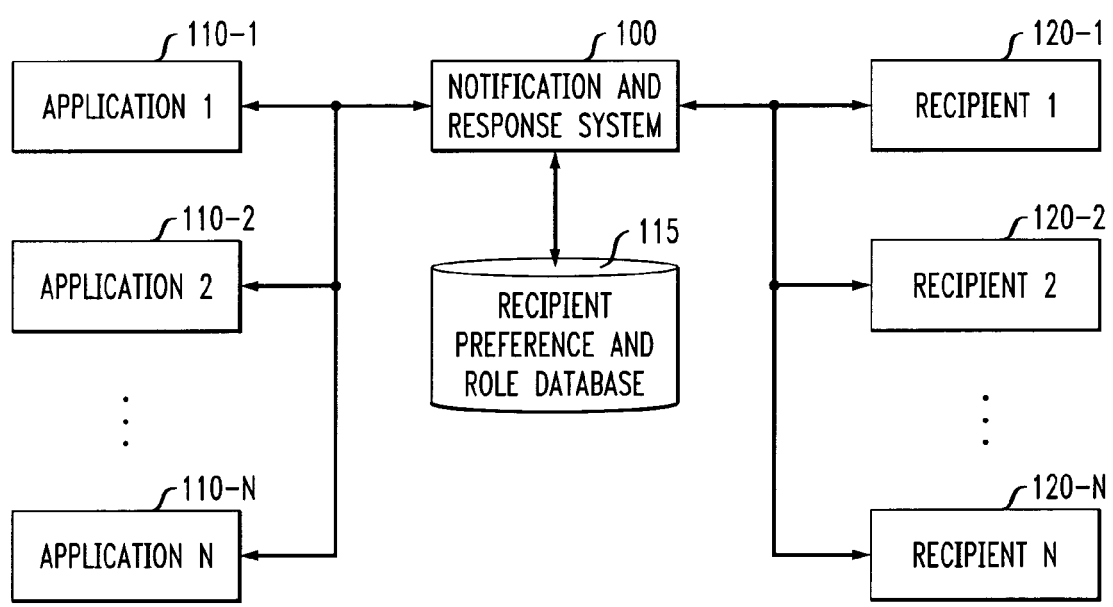
FIG. 1 illustrates an exemplary notification and response system.

FIG. 1 illustrates an exemplary notification and response system 100. The exemplary notification and response system 100 may be embodied, for example, as the Xui™ notification and response system, commercially available from Avaya, Inc. of Basking Ridge, N.J. and as described, for example, in U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

Generally, as shown in FIG. 1, the notification and response system 100 enables one or more applications 110-1 through 110-N, collectively referred to as applications 110, to communicate with one or more recipients 120-1 through 120-N, hereinafter, collectively referred to as recipients 120, by a number of different media, such as electronic mail, telephone, web page, pager or facsimile. Generally, the notification and response system 100 (i) sends requests to one or more recipients 120, using the media specified by each individual recipient 120 in accordance with the individual's preferences (and recorded for example, in a recipient preference and role database 115); (ii) collects and processes responses; and (iii) forwards the responses to their final destination by means of the medium specified by the final destination in accordance with the final destination's preferences. Roles provide a way of categorizing users and what they are allowed to do. The recipient preference and role database 115 also allows roles that are specified in a communication flow to be resolved to individual recipient names at the time the requests are transmitted.

The applications 110 create notification requests and submit them to the notification and response system 100. The notification requests must contain a communication flow to execute. Once the notification and response system 100 receives a notification request, the notification and response system 100 executes the communication flow logic to notify the recipients 120 and collect their responses.

The present invention provides methods and apparatus for dynamically adjusting membership of a communication flow expression. Generally, techniques are provided for dynamically adding or removing recipients from a communication flow. According to one aspect of the invention, referred to herein as Instant Focus Groups, the membership of a communication flow expression is dynamically adjusted to create an instant focus group. According to another aspect of the invention, referred to as Application Management of Communication Flow Participants, an application can dynamically manage the participants of a communication flow.

The context of a communication flow expression can be dynamically established or adjusted, using primitives, such as context and labels, discussed hereinafter, that provide dynamic context to the communication flow expression. As used herein, the "dynamic context" of a communication flow expression comprises updates that have been received to the data associated with the communication flow, responses received for the communication flow and the state of the executing communication flow. In addition, communication flow expressions may be processed based on their dynamic context. In one exemplary embodiment of the present invention, a number of primitives are employed that react to the dynamic context of communication flow expressions.

As discussed hereinafter, the dynamic context of a communication flow expression allows data in the request or one or more responses or labels associated with the request, to be processed and evaluated. The contextual information is available to the application for rendering its communication with the recipient. In a preferred embodiment, all data is represented in XML, and the application provides an XSLT stylesheet which the system employs for rendering. The data can trigger a particular action upon a predefined condition. The predefined condition may be, for example, data having a predefined value, the updating of the request or the receipt of a response. The triggered action may be, for example, a communication flow expression proceeding, for example, by sending one or more notifications. The present invention provides additional functionality to establish and adjust the communication flow expression, and to alter the processing of a communication flow expression based on the dynamic context.

Generally, a communication flow manager interprets the target communication flow defined in a request into a more efficient, tree structured internal representation. In addition, the communication flow manager traverses the tree representation and, in the process, expands non-terminal nodes, which represent recipients, and instantiates terminal nodes which are typically devices, but may also communicate with applications or perform internal processing. Thus, the string containing the communication flow expression is initially parsed into a parse tree, using known techniques. Generally, a parse tree is an in-memory representation of the expression composed of objects called nodes. Each node in the tree is either an operator or an operand. Operators determine a result based on their operands. Operands determine their result using logic and input from the system or a user. Operators can be operands to other operators.

After parsing, the tree is a connected set of nodes that do not have a value. In order for the tree to have a value, the tree must be evaluated. A method of the root node is invoked, and if it is an operator, the method fetches the value(s) of its operand(s) according to its functionality. If the operator completes, the value is passed back up the parse tree. Since each operand can be an operator, this evaluation will traverse down the tree until a leaf node is encountered. Each node evaluation can cause the tree to change, especially if a conditional operator is present and the condition returns a truth-value.

Communication Flow Primitives

As previously indicated, communication flow expressions specify the recipients that shall receive a request and how, when and where the recipients shall receive the request. The primitives included in a communication flow expression specify whether to contact the recipients simultaneously or sequentially, and when execution of the sub-expression should terminate by defining a logical combination of success test results. For a detailed discussion of a number of suitable communication flow primitives and their corresponding truth tables, see U.S. patent application Ser. No. 10/184,325, filed Jun. 26, 2002, entitled "Method and Apparatus for Automatic Notification and Response Based on Communication Flow Expressions," incorporated by reference herein.

FIGS. 2A through 2J, collectively, are an operator table 200 that lists a number of exemplary communication flow operators. As shown in FIGS. 2A through 2J, for each communication flow operator identified in field 210, the operator table 200 identifies the corresponding operator type in field 220, and whether or not they have a binary form or can take a list as an operand in fields 230 and 240, respectively. If an operator is related to another operator, then the related operator is also listed in field 250. Two operators are related when they have similar truth tables, but one is sequential (seq.) and the other is parallel (par.).

The truth table that corresponds to the operator is identified in field 260, and examples of the operator are provided in field 270. It is noted that not all operators have actual tables, but instead have a description of how the truth value is determined. If a table is present, then F stands for FALSE, T for TRUE, and X for MAYBE. Also, since the order of evaluation does not matter for parallel operators, the left operand is the first operand to respond and the right operand is the second to respond.

FIGS. 3A through 3T illustrate the truth tables for a number of the operators indicated in FIGS. 2A through 2J. A number of operators can be grouped into parallel/sequential pairs. Parallel and sequential primitives differ in how the operands are evaluated. A sequential operator is one that will evaluate each operand in order from left to right and will only process the next operand when a truth-value is received for the current one. A parallel operator is one that will evaluate all of its operands at once and then will wait for a truth-value to be generated on one or more of them. A time operator is one that involves scheduling a communication flow expression to be evaluated at a particular time.

Advises

ADVISES is a binary operator that causes a communication flow expression to be evaluated outside of the scope of the main expression. The truth table for the ADVISES operator is given in FIG. 3A. The value of the operator is determined by the left operand. When the left operand resolves to a truth-value, then the right operand is evaluated and is attached to the request as operating OUT-OF-BAND and any response received to that expression is treated as a comment but does not affect the truth-value of the application communication flow.

The right operand has OUT-OF-BAND attached as a label to it when advises starts its evaluation, this label can be tested inside the application to provide additional context to the recipient or to mark a response as not affecting the outcome of the request. The parallel operator related to the ADVISES operator is the INFORMS operator.

The ADVISES operator is used as follows:
cf_expression1 ADVISES cf_expression2

The left-most operand determines the truth-value of the primitive. The right-most operand is contacted after the left-most operand completes, and may respond depending on the controls of the application, for example, in an XSLT stylesheet. Responses, if received, are considered comments to the request, and are listed separately in response collations and in returned responses. Responses from the right operand do not affect the truth-value of the overall expression (or any expression containing it). The ADVISES primitive could be used to remind a recipient of commitments made in the initial response until the request completes or the commitment is satisfied.

After

AFTER is a time operator that indicates when a communication flow should begin execution. The truth table for the AFTER operator is given in FIG. 3B. When the time is reached, the AFTER operator replaces itself with its child communication flow and starts its evaluation.

The AFTER operator is used as follows:
cf_expression AFTER time_expression

If the time_expression contains a time_domain and the starting point of an increment on a time_domain is after the end of the last interval in the time_domain, then cf_expression is evaluated immediately.

And

The AND operator is a parallel operator that will evaluate all of its operands and return TRUE if and only if all of its children return TRUE. The truth table for the AND operator is given in FIG. 3C. A MAYBE value for one of its operands does not immediately complete the operator, but the operator's value can never be TRUE. A FALSE value for one of its operands will complete the operator immediately and cause it to have a value of FALSE. The sequential operator related to AND is the operator ANDTHEN.

The AND operator is used as follows:
cf_expression1 AND cf_expression2
AND {cf_expression1, cf_expression2, ... }

Andthen

The ANDTHEN operator is a sequential operator that evaluates its children starting from the left and will evaluate the next child only if the previous child evaluated to TRUE. The truth table for the ANDTHEN operator is given in FIG. 3D. The parallel operator related to ANDTHEN is the operator AND.

The ANDTHEN operator is used as follows:
cf_expression1 ANDTHEN cf_expression2
ANDTHEN {cf_expression1, cf_expression2, ... }

Broadcast

The BROADCAST operator is a parallel list operator that evaluates all of its children and waits for them to complete. The truth table for the BROADCAST operator is given in FIG. 3E. The sequential operator related to BROADCAST is the operator SURVEY.

The BROADCAST operator is used as follows:
BROADCAST {cf_expression1, cf_expression2, ... }

The BROADCAST primitive waits until all expressions in the list have reached a final truth value (true, false, maybe). The BROADCAST primitive, however, is always true and its true value indicates that BROADCAST has completed. Sometimes a communication flow must complete contacting all members of a group irrespective of the truth-value of the responses by individuals. In this case the truth value may be used to control the communication flow of the individual exclusively. Questions in the notification might, for example, ask if the individual wishes to continue receiving reminders. An answer of no or false, might then shut off the reminders in the personal communication flow of the individual without affecting the overall communication to the group.

Consult

The CONSULT operator is a parallel list operator that evaluates all of its children and waits for one of them to result in a TRUE or FALSE. This result is returned as the value of the operator, but the remaining operands are placed OUT-OF-BAND so that they can continue operation but have no affect on the outcome of the overall expression. They are additionally tagged with the OUT-OF-BAND label. The truth table for the CONSULT operator is given in FIG. 3F.

The CONSULT operator is used as follows:
CONSULT {cf_expression1, cf_expression2, . . . }

Delegates

The DELEGATES operator is a sequential operator that evaluates each operand starting with the left most, and then evaluates each subsequent one if and only if the previous operand evaluated to MAYBE. The truth table for the DELEGATES operator is given in FIG. 3G. The parallel operator related to DELEGATES is the operator RACES.

The DELEGATES operator is used as follows:
cf_expression1 DELEGATES cf_expression2
DELEGATES {cf_expression1, cf_expression2, . . . }

During

The DURING time operator causes its child cf_expression to be executed during the given time_domain. If the current time is within the specified time domain, then the expression evaluates immediately, otherwise it sets a timer to begin processing of the expression when the current time is within the time domain. The truth table for the DURING operator is given in FIG. 3H.

The DURING operator is used as follows:
cf_expression DURING time_domain

From-To

The FROM-TO time operator indicates a start and end time for the evaluation of a communication flow. This is a convenience operator to make an expression more legible than it would be if AFTER and UNTIL were used. In fact, the exemplary notification and response system 100 converts a FROM-TO expression into an expression using AFTER and UNTIL. The truth table for the FROM-TO operator is given in FIG. 3I.

The FROM-TO operator is used as follows:
cf_expression FROM time_expression1 TO time_expression2
and is equivalent to:
(cf_expression UNTIL time_expression2) AFTER time_expression1

If the starting point of an increment on a time_domain in time_expression1 does not exist within the time_domain, then cf_expression is evaluated immediately. If time_expression2 contains a time_domain that is empty or an error occurs when time_expression2 is evaluated, then cf_expression will not timeout.

If-Then-Else

The IF-THEN-ELSE operator provides a mechanism for conditional (cond.) branching within communication flows. If the IF expression evaluates to TRUE, then theN expression replaces the operator and will determine the truth value of the operator. If the IF expression evaluates to FALSE or MAYBE, then the ELSE expression replaces the operator and will determine the truth value of the operator. The truth table for the IF-THEN-ELSE operator is given in FIG. 3J.

The IF-THEN-ELSE operator is used as follows:
IF cf_expression1 THEN cf_expression2 ELSE cf_expression3

Informs

The INFORMS operator is a binary operator that causes a communication flow expression to be evaluated outside of the scope of the main expression. The value of the INFORMS operator is determined by the left operand. When the operator is first evaluated, both operands are evaluated, but the right operand is attached to the request as operating OUT-OF-BAND and any response received to that expression is treated as a comment and does not affect the truth-value of the main communication flow. The truth table for the INFORMS operator is given in FIG. 3K.

The right operand has OUT-OF-BAND attached as a label to it when INFORMS starts its evaluation, this label can be tested inside the application to provide additional context to the recipient or to mark a response as not affecting the outcome of the request.

The sequential operator related to INFORMS is the operator ADVISES. The INFORMS operator is used as follows:
cf_expression1 INFORMS cf_expression2

The left-most operand determines the truth-value of the primitive. The right-most operand is contacted in parallel, and may respond depending on the controls of the application, for example, in an XSLT stylesheet. Responses, if received, are considered comments to the request, and are listed separately in response collations and in returned responses. Responses from the right operand do not affect the truth-value of the overall expression (or any expression containing it). This INFORMS primitive could be used, for example, to keep colleagues, friends and family informed of notifications one receives.

Not

The NOT operator performs a logical negation on its operand. The truth table for the NOT operator is given in FIG. 3L. The NOT operator is used as follows:
NOT cf_expression Or The OR operator is a parallel operator that evaluates all of its operands initially. The OR operator will complete as soon as one of its operands results in a truth-value of TRUE. The truth table for the OR operator is given in FIG. 3M. The sequential operator related to OR is the operator ORELSE. The OR operator is used as follows:
cf_expression1 OR cf_expression2
OR {cf_expression1, cf_expression2, . . . }

Orelse

The ORELSE operator is a sequential operator that evaluates its children starting from the left and will evaluate the next child only if the previous child evaluated to FALSE. The truth table for the ORELSE operator is given in FIG. 3N. The parallel operator related to ORELSE is the operator OR. The ORELSE operator is used as follows:
cf_expression1 ORELSE cf_expression2
ORELSE {cf_expression1, cf_expression2, . . . }

Polls

The POLLS operator is a sequential list operator that evaluates each of its children in order, its value is determined by the number (or percentage) of TRUE values required. Due to the preemptive evaluation of this operator, it is possible that all operands will not be evaluated. The POLLS operator is the only sequential operator that resolves all of its operands before evaluating the first operand. This allows the POLLS operator to determine an early termination point. The truth table for the POLLS operator is given in FIG. 3O. The parallel operator related to POLLS is the operator VOTES. The POLLS operator is used as follows:
{cf_expression1, cf_expression2, cf_expression3, . . . } POLLS n
{cf_expression1, cf_expression2, cf_expression3, . . . } POLLS p%
where n is the number of TRUE responses required by POLLS to return TRUE, and p% is the percentage of TRUE responses required by POLLS to return TRUE.

Races

The RACES operator is a parallel operator that evaluates all of its children and completes as soon as any operand results in a truth-value of TRUE or FALSE. The truth table for the RACES operator is given in FIG. 3P. The sequential operator related to RACES is the operator DELEGATES. The RACES operator is used as follows:

cf_expression1 RACES cf_expression2
RACES {cf_expression1, cf_expression2, ... }
Survey The SURVEY operator is a sequential list operator that evaluates each of its children in order from left to right regardless of the value of the preceding operand. All operands will eventually be evaluated until SURVEY completes, or is canceled. The truth table for the SURVEY operator is given in FIG. 3Q. The parallel operator related to SURVEY is the operator BROADCAST. The SURVEY operator is used as follows:

SURVEY {cf_expression1, cf_expression2, ... }

The SURVEY primitive contacts each expression in the list when the previous expression has reached a final truth value (true, false, maybe). The SURVEY primitive completes after the last expression completes. The SURVEY primitive, however, is always true and its true value indicates that SURVEY has completed.

Until

The UNTIL operator is the time operator that indicates when a communication flow should stop executing. The truth table for the UNTIL operator is given in FIG. 3R. The UNTIL operator is used as follows:

cf_expression UNTIL time_expression

If time_expression contains a time_domain that is empty, or an error is generated while evaluating the time_expression, then cf_expression will not timeout.

Votes

The VOTES operator is a parallel list operator that evaluates all of its children, its value is determined by the number (or percentage) of TRUE values required. The truth table for the VOTES operator is given in FIG. 3S. The sequential operator related to VOTES is the operator POLLS. The VOTES operator is used as follows:

{cf_expression1, cf_expression2, cf_expression3, ... }
    VOTES n
{cf_expression1, cf_expression2, cf_expression3, ... }
    VOTES p% where n is the number of TRUE responses required by VOTES to return TRUE, and p% is the percentage of TRUE responses required by VOTES to return TRUE.

When-IsTrue-IsFalse-IsMaybe

The WHEN-ISTRUE-ISFALSE-ISMAYBE operator allows conditional branching within an expression by allowing the user to specify what is to happen for each possible truth-value of the conditional. The truth table for the WHEN-ISTRUE-ISFALSE-ISMAYBE operator is given in FIG. 3T. The operand of the operator specified for the value of the conditional replaces the operator and evaluation continues with that operand. If an operand is not specified for a particular value, then the operator results in that value. The order in which the value-operand pairs are given does not matter. The WHEN-ISTRUE-ISFALSE-ISMAYBE operator is used as follows:

WHEN cf_expression1
[ISTRUE cf_expression2]
[ISFALSE cf_expression3]
[ISMAYBE cf_expression4]

Primitives that Provide Dynamic Context

As previously indicated, communication flow expressions in accordance with the present invention may be processed based on dynamic context. In one exemplary embodiment of the present invention, two language constructs, context and labels, discussed hereinafter, are employed to provide dynamic context to the communication flow expression.

Context Primitive: Setting Context for an Expression in the Root Flow

Some communication flow operands and test expression functions require a context in order to properly evaluate. The context is typically set when a user's name is resolved to a communication flow expression and it is the user. Therefore, application expressions have no context and any direct children that are not people, also have no context. This can be a problem for the EVAL function and the WATCH operand, each discussed below. Since the EVAL function and the WATCH operand (when it is interested in a specific data element) keep track of the last element viewed and this count is stored in a map keyed by the element name and the context, there could be collisions between the EVAL function and any other WATCH operands if they are all viewing the same data element. For example, the following application communication flow expression would have indeterminate results since there are two watch operands counting responses:

```
BROADCAST {
    ham, joann,
    WATCH "xui:response" ?
    data("xui:response[%%INDEX%%]/@uid") = "joann" ?
        ANDTHEN ham,
    WATCH "xui:response" ?
    data("xui:response[%%INDEX%%]/@uid = "ham" ?
        ANDTHEN joann
}
```

If the application was trying to notify "ham" and "joann" and then send a notification when the other responded, this would not work. One of the watch operands would consume all of the responses not letting the other see them because they share the same context. In order to resolve this problem, a context function allows the application to set the context for a communication flow expression that is executed at the root level:

CONTEXT(string userContext, cfexpression expr)

When the expression parser encounters a context function in its grammar, it calls a method on the root of the subtree created by parsing the second argument of the context function, in order to set the context. This method call causes the context to propagate down the subtree, setting the context on all nodes that do not currently have a context defined. If the "userContext" argument is NULL, then the context is unset for the entire subtree, allowing subsequent context functions to set the context on the entire subtree.

The above expression can now be rewritten as:

```
BROADCAST {
    ham, joann,
    CONTEXT("uid=ham,ou=Research,o=Avaya",
        WATCH "xui:response"
            ? data("xui:response[%%INDEX%%]/@uid") =
            "joann" ?
            ANDTHEN ham),
    CONTEXT("uid=joann,ou=Research,o=Avaya",
        WATCH "xui:response"
            ? data("xui:response[%%INDEX%%]/@uid =
            "ham" ?
            ANDTHEN joann)
}
```

With the context set appropriately to the context of the appropriate user, there is now no longer any concern for a collision.

However, since the keys for the indices in the map are global to the active communication flow, if either "ham" or "joann" are watching responses in a personal communication flow expression, it is possible to still have a collision because the context would be the same as the one set in the application communication flow expression. In specifying the first WATCH parameter, applications and users can mitigate this effect by selecting a specific data element in the response to watch thereby reducing the probably of collisions.

There are security implications for setting the context. If there is no context, then it is assumed to be the application communication flow expression, and therefore all of the responses received are available to the WATCH operand and any data( ) function in the test expression. Setting a context can limit the set of responses if a system privacy flag is set on any of them and the user represented by the context is not authorized to view them. Since the setting of the privacy flag is application controlled, it is assumed that it would not be used when an application is using an expression similar to the given example.

Labels

As discussed hereinafter, a label provides a mechanism for an application to provide context through labels when a communication flow is generated. Labels are inherited by all of the child nodes of the node to which they are applied. When dynamic delegation occurs, i.e. a user replaces his/her personal communication flow with an alternate communication flow, the new communication flow for the user inherits the labels of its parent, but not any labels from the previous and now replaced user communication flow. Labels are also unique; if a label is applied more than once the duplicate is thrown away. This is important with regards to recursion and loop detection (as discussed herein).

U.S. patent application Ser. No. 10/999,890, filed Nov. 30, 2004, entitled "Method and Apparatus for a Publish-Subscribe System with Access Controls," and incorporated by reference herein, discloses a subscription server that notifies users of information based on subscriptions that have been entered by the user. The subscription server provides a list of one or more subscribable objects to the users; and the users provide a subscription request based on at least one of the subscribable objects.

Generally, the subscription server matches data of events against subscriptions to get a list of recipients for each event. The list of recipients includes subscribers who subscribe to the event themselves and delegates who receive the delegation of the event from someone else. If the recipient list is not empty, a request will be sent out with a communication flow containing those recipients as its target. When the subscription server composes the communication flow, the subscription server includes the subscription ID, and/or delegation information in labels for each recipient in the list. For example:
(BROADCAST {NORESULT, [SubscriptionID: 26600092] <uid=user1,ou=people,o=avaya.com>, [SubscriptionID: 49686824]
<uid=user2,ou=people,o=avaya.com>}) ? response('submit')='Yes' 11 response('submit')='Watch'?
In another example:
(BROADCAST {NORESULT, [Delegationtype: SHARED] [SubscriptionID: 26601102] ([Delegatedby: UserA] <uid=UserB,ou=people,o=avaya.com> RACES [Delegatedto: UserB] <uid=UserA,ou=people,o=avaya.com>)}) ? response('submit')='Yes' || response('submit')='Watch'?

Labels are the fragments enclosed in a pair of square brackets. They provide a context for the expression that follows. When the notifications for these subscriptions are delivered, the application or the system can use the context to tell the recipient the subscription that generated the message, and, if a delegation, information about the delegation.

The exemplary notification and response system 100 is a rule-based notification system. For a more detailed discussion of communication rules, see, U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein. For example, recipients can specify rules for refining communication flow expressions with details of how, i.e., which devices to use, and when to contact them.

Generally, communication rules are used to describe the condition under which one notification profile will be used. Labels provide the context, so they are good candidates to be used in the communication rule as a condition. When users create subscriptions using the subscription portal, a web-based user interface, they also create communication rules, which associate notification profiles with certain subscriptions. Each communication rule is assigned a number. A communication flow engine evaluates each user's communication rules in numeric order and applies the first one that matches. Thus, labels simplify ordering of subscriptions to determine which preferences to use when multiple subscriptions match.

FIG. 4 illustrates an exemplary interface 400 for ordering subscriptions based on labels. As shown in FIG. 4, an exemplary user (userA) has subscription 55027102 (102) and subscription 55027113 (113). The user subscribes to Company One's high severity cases in subscription 102. Because Company One is his customer, he uses a more urgent profile "7×24 Profile" for this subscription. The user also subscribes to all top customers' high severity cases in subscription 113 using a less proactive profile called "Informational Profile."

Because Company One is one of the top customers, both subscriptions will match Company One's high severity cases. The communication flow of the request of such a case includes the user, userA, as one of its recipients with two labels.
(BROADCAST {NORESULT, [SubscriptionID: 55027102] [SubscriptionID: 55027113]<uid=userA,ou=people, o=avaya.com>}) ? response('submit')='Yes' || response ('submit')='Watch' ?

The ordering of the rules will eventually decide which rule to pick. UserA can use arrows, as shown in FIG. 4, to order those communication rules. This simplifies the ordering of subscriptions and the rule matching process.

First, the labels provide one characteristic of the incoming message to match. In the absence of a facility for matching incoming messages against the subscription ID (i.e. labels), the rule processing software would need to match a more complex relational expression on the content of the message to see if it matched a given subscription. It has additional disadvantages besides complexity. The subscription server already matches the complex logical expression as part of determining that the subscription matches the incoming request. Having the communication flow rules also do this matching is redundant. Another disadvantage is that both the subscription server and the communication flow engine must have the text of the full logical expression, and they use different data stores. This can cause skew between the data stores.

Second, the labels for subscription IDs provide a set of disjoint rule conditions for evaluating which rule matches.

Either the subscription for the rule generated the notification or not. Without the labels, users or the interface software would need to order a user's subscriptions based on the relational expressions satisfied by the subscription. They would need to order the overlapping subscriptions from the most specific to the least specific relational expression. This is the way that the subscriptions in FIG. 4 are ordered. Moreover, some subscriptions will partially overlap and further confuse the issue. For example, if the first subscription in FIG. 4 was changed to subscribe to high severity cases for Company One or Company Two, and only Company One was a Top Customer, the resulting two subscriptions would not completely overlap. Now, add a subscription to all cases for Company Two. There are no complete orderings from specific to general of the three subscriptions, and this is likely to confuse the user further. It is also likely to be difficult to manage if an attempt is made to aid the user. With labels, understanding how to order subscriptions from specific to general is not necessary. The intention of the user is clear, because the user is ordering unique subscription IDs where only one will apply in each test.

Figure 5:
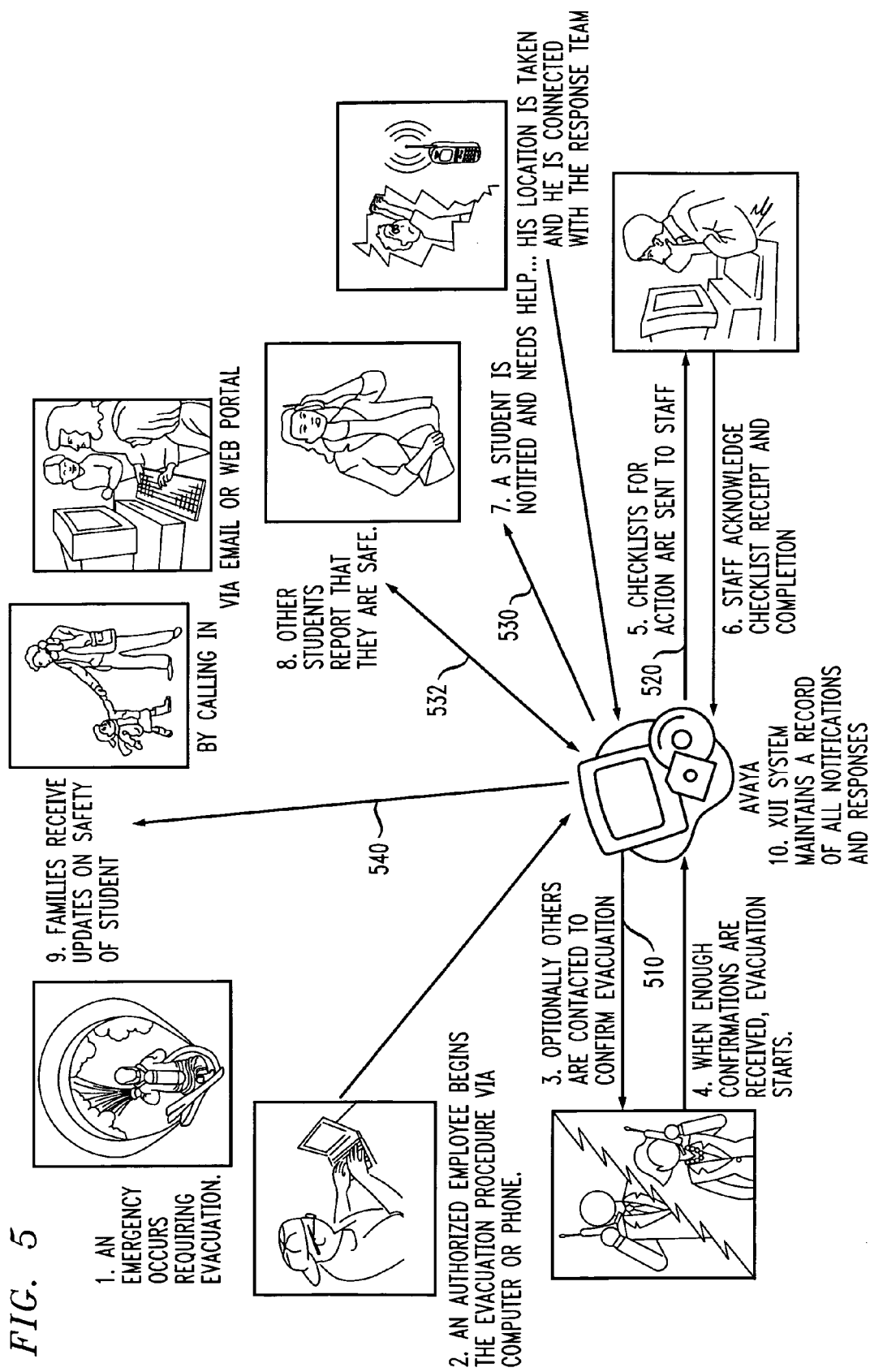
FIG. 5 illustrates the identification of phases of a communication using labels, in accordance with the present invention.

FIG. 5 illustrates the identification of phases of a communication using labels, in accordance with the present invention. Labels can also be used to provide context when applications generate a communication flow. For example, as shown in FIG. 5, assume an application has four different types of interactions that are planned with recipients depending on the phase of the communication or other criteria. In FIG. 5, a first group is contacted during step 510 and asked to confirm evacuation, a second group is sent checklists of actions to follow during step 520, a third group is asked for their location, condition and whether they need assistance during steps 530 and 532, and a fourth group receives reports on the condition of the third group during step 540. The communication flow subexpression for contacting each group can be preceded by a label identifying their role in the communication. The application can then use the label to determine which interaction to have with the recipient.

Labels also provide a tracking mechanism that helps to associate the result (this person is included in the communication flow) with the reason (he/she subscribed or is delegated to this event). This information is useful for users to maintain their profiles and subscriptions and for system administrators to monitor the system. It can be used for reporting and database analysis. Labels can also be tested in a conditional expression of a communication flow, for example, to trigger an action.

Primitives that React to Dynamic Context

As previously indicated, communication flow expressions in accordance with the present invention may be processed based on dynamic context. In one exemplary embodiment of the present invention, a number of primitives, discussed hereinafter, are employed that react to the dynamic context of communication flow expressions.

Eval Primitive

An EVAL function allows an application to extend the root communication flow using expressions added to the data or located in user responses. The function has the following form:

EVAL(string watchString, test_expression conditional, string evalString)

where "watchString" is an XPath expression that indicates the data being watched that will trigger evaluation of the conditional. If the conditional is true, then the "evalString" (also a XPath expression) is evaluated to fetch the expression from the data. Using known techniques, discussed briefly above, this expression is parsed into a subtree that is added as a child of the eval function's parent node. It is noted that "evalString" is optional, if it is not specified, it is assumed to be "(watchString)[%%INDEX%%]". When EVAL begins execution, it iterates over all values of the watched expression. This may cause it to trigger several times for values that already exist, and then to trigger for new values as they arrive.

The EVAL function may only be used in the application root communication flow expression and then only as the child of a parallel list operator such as BROADCAST or RACES. If the EVAL function is used in the expression of a user, or its parent is not a parallel list operator, the EVAL function will replace itself in the parse tree with a MAYBE value.

Consider the following example:
BROADCAST {EVAL('commflow', ? true ?, 'commflow [%%INDEX%%]'),
<ham>, <joann>}

This example says to contact the users "ham" and "joann" and every time a new "commflow" element is added to the data, take its value, parse it and add the new subtree as a child of BROADCAST (the parent node of the EVAL). In the example, the %%INDEX%% string is replaced with the index number of the element in the data that should be accessed. FIG. 6 illustrates a parse tree 600 built from this expression, it contains four nodes 611-614 with the root 611 of the tree 600 being the BROADCAST operator (for clarity, the names have not been further resolved in the example.)

FIG. 7 shows the modified parse tree 700 after a "commflow" element with a value of 'yangqian' was added to the data—a new name node 720 has been added to the tree 700.

Watch Primitive

The WATCH operand is always associated with a test_expression and it is evaluated at runtime. However, watch will block until its test_expression evaluates to true, and then it will evaluate to TRUE. There are two forms of WATCH.

The first form of the WATCH primitive is the simplest, it evaluates its test_expression the first time it is encountered and if test_expression is false, then it is evaluated each time the request data is modified or a response is submitted.

The second form of the WATCH primitive is monitoring a specific element in the data, or the responses and allows iteration over all values. It will evaluate its test_expression when a new value is added for the element being watched, or a new response is submitted. In addition to changes seen after watch has started, it will also iterate through all values for the watched element (or responses) that were posted before the watch was initially evaluated and evaluate the test_expression on each value. If %%INDEX%% is used in the test_expression, WATCH will replace it with the index of the value to test. If this form is not used in a recursive expression, then its behavior is the same as the first form.

The WATCH primitive is used as follows:
WATCH test_expression
WATCH string test_expression In the second form of the WATCH operand, the string before the test_expression contains the name of the data element being watched. For example, the following expression:
WATCH ? boolean(xui:response[xui:responder/@uid='John']) ?
evaluates to true if the user John has submitted a response, if John has not submitted a response, then this will block until he does.

In a further example, the following expression:
WATCH 'status' ? data('status[%%INDEX%%]')=='field' ?
evaluates to true when the status element in the data contains a value of 'field'.

Instant Focus Groups

U.S. patent application Ser. No. 10/999,909, filed Nov. 30, 2004, entitled "Method and Apparatus for a Publish-Subscribe System With Templates For Role-Based View Of Subscriptions," combines subscription services and response sharing to create a community of interest focused on a particular problem. For example, for product repair tickets, recipients of a message subscribe based on their interests or job role. One recipient may be interested in repairing problems that occur in New Jersey, and subscribe by geography. Another recipient may be interested in maintaining a strong business relationship with a particular customer, and subscribe by customer. Yet another recipient may be interested in tracking and resolving severe problems with a particular product, and subscribe by product. These recipients may not know each other, or that they are, in fact, working on the same problem. The recipients are all included in the same communication flow. By virtue of this inclusion, the system, at the option of the application, can inform the recipients of each other's inclusion and responses. The sharing of their responses, in particular, allows them to discover their mutual interest, and work more constructively together.

A communication flow may also be created by an application which uses its own rules for determining the recipients and creating the communication flow. A communication flow may be a named communication flow which can be created in a variety of ways. The named communication flow, for example, may contain interested recipients who have signed up to receive a certain class of messages or relevant recipients as determined by some business process.

However the communication flow is created, the communication flow and the sharing of information on the recipients and their responses in the context of a particular request forms the community of interest. The community of interest is focused on the issues in the notification and response request.

Instant focus groups in accordance with the present invention extend communities of interest to the next level by giving recipients the ability to receive additional notifications as group members post responses. At the discretion of the application, participants in the original request can opt to be notified via their preferred media of all responses posted by others or just some of them according to who sends the response or what information the response contains.

Instant focus groups provide real-time information sharing with volume control. Updates are received only for selected information about selected problems. FIG. 8 is an exemplary user interface that provides a portal to a community of interest responses. For example, as shown in FIG. 8, the interface 800 includes a Submit attribute 820 that includes "yes" to take responsibility for the problem, "watch" to remain informed of the problem, or "no" to indicate that the recipient will not take action on the problem. Recipients can also comment to provide useful information to the community. A member of the community of interest may want real-time notification of responses from those who take responsibility or are watching the progress of the problem, and the individuals providing these answers are part of the member's focus group. In FIG. 8, the messages in this instant focus group would include those messages in section 810 from Joann Ordille and Jerry Ryan.

Figures 9, 10:
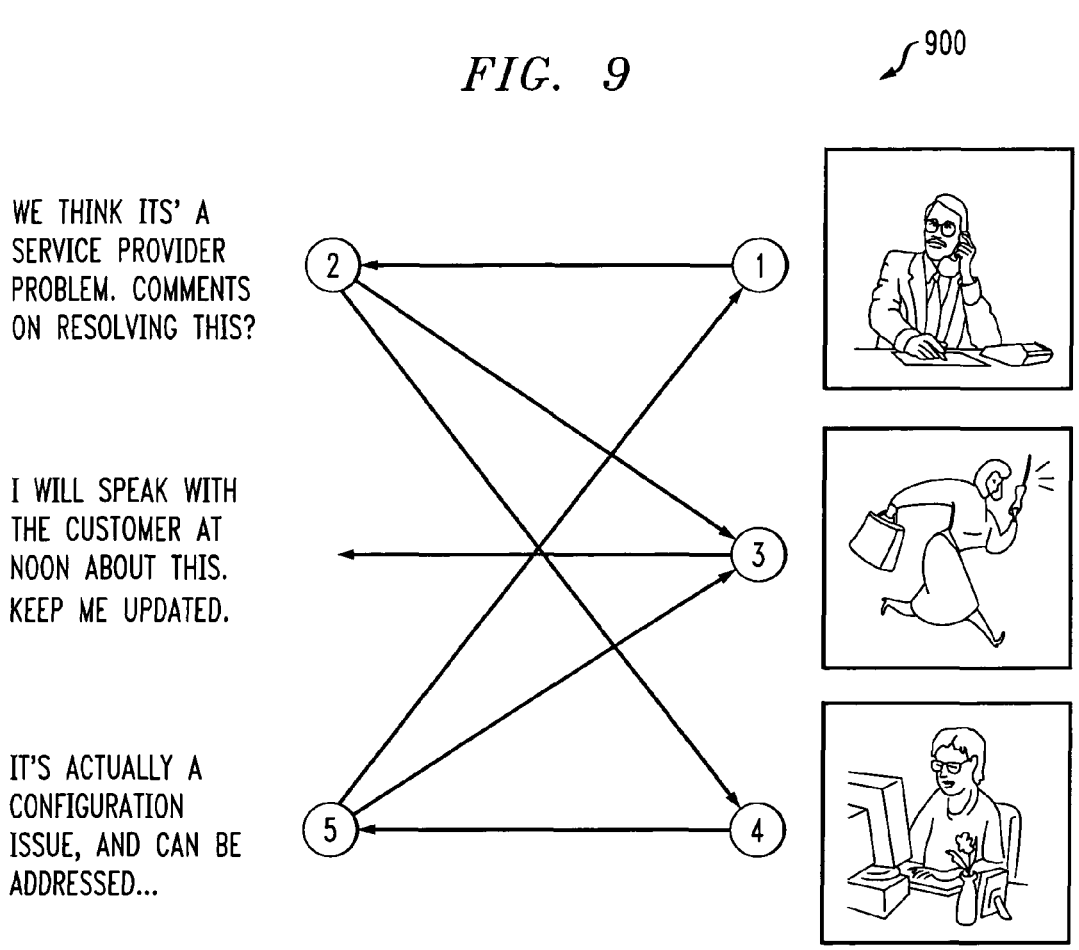
FIG. 9 illustrates the interaction of recipients in accordance with a symmetric instant focus group.
FIG. 10 illustrates an exemplary subscriber and delegate table that tracks the membership of subscription server communication flows in process.

When all recipients indicate that they wish to receive notifications of all responses on a message, they become participants in a symmetric instant focus group. Recipients are notified of responses from each other, and they can interact in real-time by responding to each other's messages, as shown in FIG. 9. In FIG. 9, arrows point to the left for responses returned from recipients and arrows point to right for responses that are propagated to others. Sequence numbers provide the order in which one or more messages are sent. The man in upper right responds (1), and his response is propagated (2) to the two other members of the instant focus group, and so on.

When recipients limit the responses they receive in notifications to responses of differing types or some recipients refuse notifications or responses, they become participants in an asymmetric instant focus group. Not all recipients see messages that respond to their responses. In this case, the application may enforce the forwarding of responses that reply to an individual's message to the individual even if the individual did not opt into the instant focus group. This can create a side conversation between the two people which may be public or private.

The application chooses whether or not to enable instant focus groups, and which kind of instant focus groups to enable for recipients of its messages. This is done in two ways. First, the application can provide questions that allow the participant to opt into or out of the instant focus group when notifications are received. Second, the application can dictate whether or not the user is part of the instant focus group.

The creation of the additional instant focus group notifications is done by communication flows. To illustrate the technique, consider a simple symmetric instant focus group where participation is required by the application. All messages are sent to each participant, so responders see their own messages. The communication flow is given below for participants joann, ham and yangqian.

BROADCAST{joann, ham, yangqian, WATCH "xui:response" ? true ? ANDTHEN [FOCUS GROUP] THIS}

BROADCAST sends the initial message to joann, ham and yangqian. WATCH waits for each new response, designated by the XPath expression "xui:response" (See, e.g., "XPath Tutorial", http://www.w3schools.com/xpath/default.asp). When the response arrives WATCH evaluates to true and then recurses to repeat the communication flow. The message includes the label FOCUS GROUP, so the rendering application can present the message appropriately, as a notification of a response in the instant focus group. In this example, it is actually the WATCH sub-expression and recursion that creates the instant focus group. This instant focus group has limitations, because users receive messages about their own responses and they receive one message per response even when they have possibly already been presented with the response.

A variety of instant focus groups can be supported by one communication flow provided the application returns certain parameters in every response for the communication flow to test. These parameters are:

focus indicates whether or not the responding user is in the focus group. Focus is set to "true" to add or keep the person in the focus group. Focus is set to "false" to remove or keep the person out of the focus group. Applications may set focus for each person to match the applications' requirements, or they may obtain the value from the user.

context indicates the context for communication flows executed on behalf of the user. In systems that use LDAP directories for their communication preference store, the context is the distinguished name of the user.

lastviewed indicates the time of the last response presented to the user. Users enter or continue in the focus group after responding to a message. At the time of that response, the user may have already viewed or heard several responses from other users. Setting lastviewed to the time of the last response presented suppresses additional notifications for responses already seen.

watchtest indicates the filter to be applied before sending instant focus group messages to the user. If watchtest is set to "true", all responses are sent to the user except ones occurring before lastviewed or ones sent by the user himself/herself. watchtest follows the format for test expressions in communication flows.

commflow indicates the communication flow to use to deliver focus group messages to the user. If the communication flow is set to the the user's uid, the focus group message will be delivered according to the user's rules, typically using the same communication flow that delivered the first message to which the user responded.

The communication flow that uses these parameters to create the instant focus group is an extended eval sub-expression which is available in the communication preference store as a named communication flow called instant_focus_group. It also uses a system supplied attribute "uid" which identifies the responding user in every response, and "date" which is the timestamp for the submission of the response An application uses an instant focus group by using the named communication flow as an operand in a parallel list operator in its application communication flow. Adapting the previous example, the communication flow becomes:

BROADCAST {ham, joann, yangqian, instant_focus_group}

In this example, the application sets focus to "true" and watchtest to "true" in every response to require the recipients to participate. It sets commflow to deliver the focus group messages in the same way as the original message. This instant focus group differs from the previous one in that focus group messages are only sent to recipients after they respond to the initial message, no recipient is notified of his/her own messages, and recipients only receive messages for responses they have not been previously presented to them.

The communication flow sub-expression instant_focus_group is given below:

```
EVAL ( "xui:response",
    ? data("xui:response[%%INDEX%%]/focus") = "true" ?,
    "concat('CONTEXT(\"', xui:response[%%INDEX%%]/context,'\",
        WATCH\"xui:response\" ?
        boolean( data (
            \"xui:response[%%INDEX','%%][not(@uid = \\"',
            xui:response[%%INDEX%%]/@uid,
            '\\") and number(@date) > ',
            xui:response[%%INDEX%%]/lastviewed,']\"))
        && eval(\"
            ',xui:response[%%INDEX%%]/watchtest,'\") ?
        ANDTHEN RACES {THIS, [FOCUS GROUP]',
            xui:response[%%INDEX%%]/commflow'})')")}
```

This communication flow uses EVAL to watch for each response. When the response is received, it tests focus in the specific response, which is indicated by replacing "%%INDEX%%" with the index number of the response, to see if the person wishes to be in the focus group. The data function in an EVAL or WATCH test expression allows XPath expressions over the data and responses to be used in testing.

If the test is true, then a communication flow expression is created by concatenating strings together with concat. In order to preserve the string "%%INDEX%%" in the constructed expression, the string is created via concat, because every instance of "%%INDEX%%" is replaced by the index of the current response. The resulting communication flow expression is then executed as part of the parent communication flow in the application. For a user response with the following parameters:

```
context: uid=ham, ou=Research, o=Avaya
lastviewed: 1109887109056
watchtest: (data(\"xui:response[%%INDEX%%]/@uid\") = \"joann\")
commflow: ifg_profile
uid: ham
``` the concat creates the following watch clause to run in ham's context:

```
CONTEXT("uid=ham, ou=Research, o=Avaya",
    WATCH "xui:response" ?
    boolean( data( "xui:response[%%INDEX%%]
        [not(@uid = \"ham\") and number(@date) >
        1109887109056]"))
    && eval("(data(\"xui:response[%%INDEX%%]/@uid\")
        = \"joann\")") ?
    ANDTHEN RACES {THIS, [FOCUS GROUP] ifg_profile } )
```

The WATCH clause checks each response to be sure that it is not from ham, is dated after the last response ham has seen and is in fact from "joann". If this test passes, a notification is sent to ham using his ifg_profile. In parallel, the WATCH clause is executed again via THIS, so additional responses will be forwarded. If ham responds to the notification for this response, this recursive watch communication flow completes, and the overall EVAL determines if subsequent messages should be sent to ham by testing the value of the focus parameter. If a new WATCH is created for the user, it uses an updated value from the application for the time of the last message presented to the user. It also picks up changes to the test used to filter messages or the communication flow used to deliver messages.

The instant_focus_group communication flow allows applications to set up symmetric or asymmetric instant focus groups. The application specifies "true" for focus and watchtest to establish a symmetric instant focus group. To establish an asymmetric instant focus group, the application specifies true for focus and a watchtest that selects a subset of responses. Applications can require that the focus group have a certain form by setting focus and watchtest themselves. Applications that are requiring participation in the focus group would typically set the commflow to the user's uid and allow the user to receive messages according to the user's rules.

Applications can offer a variety of services to users by allowing users to select values for focus, watchtest and commflow. The user can opt into and out of the instant focus group by choosing the value of focus. The user can select a subset of the responses for delivery by setting criteria in watchtest, typically with help from a set of options provided by the application. Whenever the user chooses to be in an instant focus group, the application can inform the user that responses will be delivered in the same way as the current message, or provide the user with a list of his/her communication flows (using a system utility) to select the delivery method. The application sets the delivery method in the commflow parameter.

Applications may also allow responders to pick specific individuals to receive their responses even if these individuals would not receive them via an instant focus group. This technique is called establishing a side conversation. In this case the application adds a parameter to every response called, for example, "RespondingTo". For each person selected by the responder, the application includes one RespondingTo parameter with the value of the person's uid. The application enforces that focus is true for every user responding to the communication flow and that every watchtest includes the following clause:

boolean(data("xui:response[%%INDEX%%]/RespondingTo[text( )='uid' ]"))

where uid is the value of the uid of the specific user to whom a response might be forwarded. If the user wishes to also set a watchtest, the boolean clause above would be combined with the user specific watchtest in a disjunction via the or operator, '||'. Such an application would want to inform people that responses may be addressed directly to them, and will use the designated instant focus group communication flow.

If an application wishes to enable side conversations that are private from everyone except the requester, then the application would add a parameter attribute such as "private" to responses that could be set to "true" when responses are addressed to specific instant focus group participants. It would then change the watch clause given above to the following for cases when the user has his/her own filter. We represent the user's filter here by personalwatch:

```
(personalwatch &&
    boolean(data("xui:response[%%INDEX%%][not(private='yes')]"))) ||
    boolean(data("xui:response[%%INDEX%%]/RespondingTo[text( )='uid']"))
``` where uid is, as before, the value of the uid of the specific user to whom the response might be forwarded.

It is to be noted that messages subsequent to the first notification (see, for example, FIG. 8) may differ from the original format at the application's discretion. Subsequent messages, i.e. focus group messages, are always identified by the label "FOCUS GROUP." While a focus group message might only contain the response being communicated, it is probably beneficial for the application to provide access to some historical context, perhaps via links to the web portal of the notification and response system 100 or via menu options in the voice portal. The questions at the end of the message would also be different, allowing the recipient to respond to the content of the response, opt into or out of the focus group, change the test for messages forwarded by the focus group, choose alternate delivery mechanisms for subsequent messages, or start a conversation with a specifically identified user or set of users.

In one exemplary application, instant focus groups are employed as market focus groups. In market focus groups, people are typically assembled together to discuss a product or service, and they are paid for their time. The instant focus group supports wider distributed participation where geographic co-location is not required. The group could exist over a longer period of time with a more lazy discussion approach, or it might still be constrained to a specific time interval. The parameter watchtest could be used by the application to segment the group into subgroups of people with like characteristics while still operating as a single overall focus group. One market focus group encouraged participation by having people type in their comments and the comments were then displayed anonymously on a screen. The instant focus group could, by application design, suppress certain information about respondents. Moreover, even if names are supplied, interaction via text or voice messaging, without others present, may encourage participation by those who are reluctant to participate in more public forums with many people present.

In another variation, people are placed into instant focus groups because they are affiliates of others in previous focus groups and the others are in this focus group. Thus, instant focus groups can also be established by the relationship between the participants. For example, additional people to be added to the focus group can be discovered by asking the participants for others to include, and then adding them to the communication flow.

The application includes one data element, referred to as AddPerson, in its response data for each person to be added. The element AddPerson contains a communication flow for contacting the person. The communication flow includes a label that the application can use during message delivery to explain to the recipient that he/she is being contacted at the request of another. The label is followed by a single uid, for example, weiss.

Using the running example, the application adds an eval sub-expression to its communication flow to add users returned in responses in the AddPerson element:

```
BROADCAST {ham, joann, yangqian, instant_focus_group,
    EVAL("xui:response//AddPerson", ? true ? ) }
```

The new person is contacted immediately, and the label is used by the application to inform the new person that they are being asked to join the instant focus group at the request of the designated person. When the newly contacted person responds, all the standard instant focus group processing also applies to them.

It is also possible for the application itself to look for users who participated in previous requests with instant focus groups and are also participating in the current group. The application would then add individuals in the older group who participated but who are not in the current group. One can imagine a wealth of similar selection algorithms for adding people to a focus group in process.

The application uses a data element in its XML data, referred to as AddPerson, for providing information on the person to be added. Since the element is in the data and not the responses, there is no name conflict. It provides the same type of information as previously described. The label now indicates that an algorithm discovered past participation of the person to be added with the current participant David Weiss. An example data element is given below:

<AddPerson>[AddReason: Past participation with David Weiss]tendick</AddPerson>

Whenever the application wants to add a person to the request in process, it sends an update request to the notification and response system 100 to append a new value for AddPerson to the request. The earlier communication flow is enhanced again to provide for the addition of new users by the application:

```
BROADCAST {ham, joann, yangqian, instant_focus_group,
    EVAL("xui:response//AddPerson", ? true ? ),
    EVAL("AddPerson", ? true? ) }
```

Here again, the new person is contacted immediately, and the label is used by the application to inform the new person that they are being asked to join the instant focus group because of activity in earlier focus groups involving a particular user. When the person responds, all the standard instant group processing also applies to them.

In another variation, the application presents a recipient with a list of users who have participated in earlier instant focus groups with the recipient. The recipient then chooses users to be added from the list.

Application Management of Communication Flow Participants

It has been found that users often want to join in on a discussion that is already in progress. For example, in a service oriented domain, a manager may wish to join in on a discussion about a particular repair that is ongoing. The manager may "subscribe" to the discussion, for example, using a repair ticket identifier. It is noted that the repair ticket identifier was not assigned prior to the generation of the repair ticket, so the manager cannot subscribe in advance of the ticket. The manager will subscribe sometime after the ticket has been created, and most probably after the ticket has been sent to other interested recipients. These recipients subscribed to the ticket based on other attributes than the ticket identifier. When the manager subscribes by ticket identifier, the manager can be added to the list of recipients participating in the communication. In a preferred embodiment, the manager is added to the communication flow in process for the ticket notification that has already started. U.S. patent application Ser. No. 10/999,890, filed Nov. 30, 2004, entitled "Method and Apparatus for a Publish-Subscribe System with Access Controls," and incorporated by reference herein, discloses an exemplary subscription server that notifies users of information based on subscriptions that have been entered by the user. The subscription server provides a list of one or more subscribable objects to the users; and the users provide a subscription request based on at least one of the subscribable objects.

Generally, the subscription server matches data of events against subscriptions to get a list of recipients for each event. The list of recipients includes subscribers who subscribe to the event themselves and delegates who receive the delegation of the event from someone else. If the recipient list is not empty, a request will be sent out with a communication flow containing those recipients as its target. When the subscription server composes the communication flow, the subscription server includes the subscription ID, and/or delegation information in labels for each recipient in the list, in the manner described above.

It is has been found that it is desirable to add or remove participants of notification and response system requests that are being processed. For example, it may be necessary to add users to requests in process that are covered by a new subscription or a modification of a subscription for the user. Adding users to the communication flow for the request in process provides them with all of the advantages of the existing community of interest or instant focus groups for that communication flow. Likewise, it may be necessary to remove users from requests in process when a subscription is deleted or a modification of a subscription results in the subscription no longer matching. Removing users from the communication flow for a request in process filters out follow-on reminders, instant focus group responses and other notifications for the deleted subscription. In further variations, delegations may need to be adjusted in requests in process when a delegation is added or removed.

To be able to add users to a notification and response request in process, the application designer creates an application with the following characteristics. The application data (XML data) has a data element for providing information on the person to be added, referred to as AddPerson. The application provides both the uid and the context identifier for the user. In systems that use LDAP for the recipient preference and role database, the context is the distinguished name of the user. The format of the data element is given below for the user "joann":

<AddPerson id="joann">uid=joann,ou=Research, o=Avaya</AddPerson>

The application communication flow contains a parallel list operator where EVAL can be used. In this example, BROADCAST is used for the overall communication flow for the application. The EVAL primitive adds additional participants as they appear in the AddPerson element in the XML data.

```
BROADCAST{joann,ham,yangqian,EVAL("AddPerson", ? true?,
    "AddPerson[%%INDEX%%]/@uid")}
```

Whenever the application wants to add a person to the request in process, the application sends an update request to the notification and response system 100 to append a new value for AddPerson for the request ID to which the person is to be added.

Likewise, to be able to remove users from a request in process, the application designer creates an application with the following characteristics. The application data (XML data) has a data element for providing information on the person to be removed, referred to as RemovePerson. The application provides both the uid and the context identifier for the user. In systems that use LDAP for the recipient preference and role database, the context is the distinguished name of the user. The format of the data element is given below for the user "joann":

<RemovePerson uid="joann">uid=joann,ou=Research, o=Avaya</RemovePerson>

The application communication flow provides a guarded expression for every user in its communication flow. The guarded expression has the following form:

CONTEXT(user context, RACES {guard, user})

The guard is a WATCH operation that completes when RemovePerson is set to a particular person. The WATCH operation can set a truth value for the guarded expression to either true or false at the discretion of the application designer. In the present example, false is used to indicate that the WATCH rather than the user completed the guarded expression. BROADCAST is used for the overall communication flow for the application. Guarded expressions are provided for each user:

```
BROADCAST {
    CONTEXT("uid=joann,ou=Research,o=Avaya",
        RACES { NOT WATCH "RemovePerson" ?
            data("RemovePerson[%%INDEX%%]/@uid") =
            "joann"?, joann}),
    CONTEXT("uid=ham,ou=Research,o=Avaya",
        RACES { NOT WATCH "RemovePerson"?
            data ("RemovePerson[%%INDEX%%]/@uid") =
            "ham"?, ham}),
    CONTEXT("uid=yangqian,ou=Research,o=Avaya",
        RACES { NOT WATCH "RemovePerson"?
            data("RemovePerson[%%INDEX%%]/@uid") =
"yangqian"?,yangqian})}
```

Whenever the application wants to remove a person from the request in process, the application sends an update request to the notification and response system 100 to append a new value for RemovePerson for the request ID from which the person is to be removed.

This communication flow for removing users can be combined with the communication flow for adding users given earlier:

```
Broadcast {
    CONTEXT("uid=joann,ou=Research,o=Avaya",
        RACES { NOT WATCH "RemovePerson" ?
            data("RemovePerson[%%INDEX%%]/@uid") = "joann"?,
            joann}),
    CONTEXT("uid=ham,ou=Research,o=Avaya",
        RACES { NOT WATCH "RemovePerson"?
            data("RemovePerson[%%INDEX%%]/@uid") = "ham"?,
            ham}),
    CONTEXT("uid=yangqian,ou=Research,o=Avaya",
        RACES { NOT WATCH "RemovePerson"?
            data('RemovePerson[%%INDEX%%]/@uid") =
            "yangqian"?,yangqian}),
    EVAL("AddPerson", ? true ?,
        "concat( 'CONTEXT(\"", AddPerson[%%INDEX%%],
        '\", RACES { NOT WATCH \"RemovePerson\" ?
            data(\"RemovePerson[%%',
            'INDEX%%]/@uid\")=\"',
            AddPerson[%%INDEX%%]/@uid, '\"? , ',
            AddPerson[%%INDEX%%]/@uid, '})')") }
```

When an application sends a request to the subscription server to be matched against existing subscriptions, that request is called a notification and response proposal. It is a proposal, because it not yet known if any subscriptions will match and generate a notification and response request with subscribers to be notified. To support the dynamic adjustment of membership of a communication flow expression generated by the subscription server, the subscription server tracks every proposal from an application by recording that the proposal is in one of the following states:

Created. The application proposed the notification and response request.

Initialized. The subscription server sent the notification and response request downstream to the notification and response system.

Uninitialized. The subscription server did not send the request downstream, because no subscriptions or escalations matched.

Completed. The application is finished with the proposed request. The proposal is no longer relevant or the downtream service completed.

For each initialized proposal, the subscription server maintains a subscriber and delegate table, 1000, shown in FIG. 10, that records each subscriber or delegate that is included in the communication flow for the proposal. The table includes a row for each subscription that matches a specific proposal. Each row contains the proposal id, 510, that links to the the table (not shown) of proposals and their states, viz. created, initialized, uninitialized and completed, described above, the identifier for a subscription that matched the proposal, 520, whether the matching subscription contained a delegation and which type of delegation, 530, and the identifiers for users included in the communication flow as a result of the match, 540.

The following is a sample communication flow generated by a subscription server which that will be altered to support the advanced services of addition and removal of users:

```
BROADCAST { NORESULT, [SubscriptionID: 53839576]
[SubscriptionID: 53839000]
<uid=ham,ou=Research,o=Avaya> } ? response('submit') = 'Yes' ||
response('submit') =
'Watch' ?
```

The first two rows of the subscriber and delegate table, 1000, contain information for the matching subscriptions for this communication flow.

Applications that wish to add to the membership of the communication flow for notification and response requests in process can configure whether new subscriptions are allowed (or required) to be matched against initialized proposals, not yet completed. If they are allowed to be matched, the subscribing user is given the option to specify whether he/she wants these matches. If they are required to be matched, the feature is active. This involves adding whether or not the option is allowed to each template, so that it can be displayed to the user.

When a new subscription is added and it asks for matches with pending proposals, the subscription server performs the following tasks:

1. Checks initialized proposals for matches to the new subscription. If found, it checks the subscriber and delegate table, 1000, to determine that the user did not already receive a notification due to an earlier subscription. If no notification has yet been sent, it does one of the following depending on a parameter on the proposal:
   1.1. Informs upstream application which can then communicate with downstream service to add the subscriber to the request in process.
   1.2. Informs downstream application which adds the subscriber to the request in process. Whether or not the subscription server initiates a new notification to the subscriber for this proposal, it records the matching subscription in the subscriber and delegate table, 1000.
2. Checks uninitialized proposals for matches. If found, it does one of the following depending on a parameter on the proposal:
   2.1. Informs upstream application which can then complete the current proposal and submit an update of the proposal to be matched with the new subscriber
   2.2. Sends the request for the current proposal to the downstream application, informs the application of the change in status, and sets the proposal to initialized.

Whenever the subscription server adds a user to an existing communication flow, it must update (or cause the application to update) the data of the request with a data element indicating the user to be added, such as the one given below for "joann":

```
<AddPerson uid="joann">
    <id>268904</id>
    <commflow><![CDATA[
        [SubscriptionID: 268904] <uid=joann,ou=Research,o=Avaya>
    ]]></commflow>
    <context><![CDATA[uid=joann,ou=Research,o=Avaya]]></context>
</AddPerson>
```

To use this update, the subscription server must augment the communication flow it generates when subscriptions match with an EVAL subexpression to allow the addition of subscribers. An example of this augmentation follows for the sample subscription server communication flow provided above:

```
BROADCAST {
    [SubscriptionID: 53839576] [SubscriptionID: 53839000]
        <uid=ham,ou=Research,o=Avaya>,
    EVAL("AddPerson", ? true ?, "AddPerson[%%INDEX%%]/
        commflow") } ?
    response('submit') = 'Yes' || response('submit') = 'Watch' ?
```

Applications that wish to remove users from the communication flow for notification and response requests in process can configure whether subscripton deletions are allowed (or required) to be matched against initialized proposals, not yet completed. If they are allowed to be matched, the subscribing user is given the option to specify wether he/she wants these matches for the purposes of removal. If they are required to be matched, the feature is active. This involves adding whether or ont the option is allowed to each template, so that it can be displayed to the user.

When a subscription is deleted and it asks for removal of the subscriber from notification and response requests in process, the subscription server performs the following tasks:

1. Checks the subscriber and delegation table 1000 for initialized proposals that matched particular subscription identifiers 520. If found, the subscription server removes the users from the subscriber and delegate table, 1000, for each proposal. After each removal, the subscription server 2.1. Informs upstream application which can then communicate with downstream service to remove the subscriber from the request in process.

2.2. Informs downstream application which removes the user from the request in process.

Whenever the subscription server removes a user from an existing communication flow, it must update (or cause the application to update) the data of the request with a data element indicating the user to be removed, such as the one given below for "ham":

```
<RemovePerson uid="ham">
    <id>53839576</id>
    <commflow><![CDATA[
        [SubscriptionID: 53839576] <uid=ham,ou=Research,o=Avaya>
    ]]></commflow>
    <context><![CDATA[uid=ham,ou=Research,o=Avaya]]></context>
</RemovePerson>
```

To use this update, the subscription server must augment the communication flow it generates when subscriptions match with an EVAL subexpression to allow the removal of subscribers. An example of this augmentation follows for the sample subscription server communication flow provided above:

```
BROADCAST { NORESULT,
    CONTEXT("uid=ham,ou=Research,o=Avaya",
        RACES { NOT WATCH "RemovePerson" ?
            (data("RemovePerson[%%INDEX%%]/@uid") =
                "ham" ) &&
            (data("RemovePerson[%%INDEX%%]/id") in {
                "53839576", "53839000" }) ?,
        [SubscriptionID: 53839576] [SubscriptionID: 53839000]
            ham })}
    ? response('submit') = 'Yes' || response('submit') = 'Watch' ?
```

The following adaptation of the sample communication flow shows how to combine the two previous communication flow enhancements that allow for the addition and removal of subscribers:

```
BROADCAST {
    CONTEXT("uid=ham,ou=Research,o=Avaya",
        RACES { NOT WATCH "RemovePerson"
            ? (data("RemovePerson[%%INDEX%%]/@uid") = "ham") ||
              (data("RemovePerson[%%INDEX%%]/id") in { "53839576", "53839000"
    }) ?,
        [SubscriptionID: 53839576] [SubscriptionID: 53839000] ham }),
    EVAL("AddPerson", ? true ?,
        "concat('CONTEXT(\"', AddPerson[%%INDEX%%]/context,
        '\", RACES { NOT WATCH \"RemovePerson\" ? data(\"RemovePerson[%%',
        'INDEX%%]/id\") = \"', AddPerson[%%INDEX%%]/id, '\" ?, ',
        AddPerson[%%INDEX%%]/commflow, ' })')") }
    ? response('submit') = 'Yes' || response('submit') = 'Watch' ?
```

In cases when a subscription is modified, adjustments can be made to the notification and response requests in process in two steps:

1. The subscriber is removed from initialized proposals that did match but do not any longer. Once the proposals are checks the table to determine if any other subscriptions would cause the subscriber to remain in the communication flow for the proposal.

2. If no remaining subscriptions for the subscriber match a particular proposal, the subscription server does one of the following:

identified, then the procedure for deletion of a subscription are followed for the affected proposals.

2. The subscriber is added to proposals that now match that did not match previously. Once such proposals are identified, then the rules for addition of a subscription are followed.

In the case of delegations, the subscription server follows a similar procedure except that delegations are always added or deleted irrespective of the content of the subscriber and delegate table 1000, because each delegation is treated independently and is not checked for overlap with other subscriptions.

When applications permit users to subscribe to transient values, such as ticket identifiers, with creation times near to the time of the notification and response request, short lifetimes, or both, the application adds the value for subscription immediately before it creates the related proposal and deletes the value after the proposal completes. In this way, transient values, such as identifiers, can be re-used for different purposes, and the amount of space consumed by values that are no longer useful is kept to a minimum.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
    receiving, by a system, a first communications flow expression from a sender, wherein the first communications flow expression comprises:
        (i) a first primitive keyword, and
        (ii) a first sub-expression;
    broadcasting, by the system, based on the first primitive keyword, a first message to a plurality of recipients, wherein the first message is broadcasted to
        (i) a first recipient in the plurality of recipients, and
        (ii) a second recipient in the plurality of recipients;
    receiving by the system:
        (i) a first response to the first message from the first recipient, and
        (ii) a second response to the first message from the second recipient;
    replacing, by the system, a parameter of the first sub-expression with an index number of the first response to determine whether the first recipient desires to be included in a first instant focus group;
    determining, by the system, that the first recipient desires to be included in the first instant focus group after the parameter of the first sub-expression is replaced with the index number of the first response;
    generating, by the system, a second communications flow expression as a result of the determination; and
    transmitting, by the system, the second response to the first recipient based on the second communications flow expression.

2. The method of claim 1 wherein the first communications flow expression also comprises a second sub-expression for adjusting a third recipient's membership in a communications flow, and wherein:
    (i) the first recipient is a member of the communications flow, and
    (ii) the second recipient is a member of the communications flow.

3. The method of claim 1 wherein the first communications flow expression also comprises a second sub-expression;
    wherein the second sub-expression comprises a second primitive keyword for adding a third recipient to the first instant focus group; and
    wherein the third recipient is added to the first instant focus group based on the fact that the first response comprises an identifier of the third recipient.

4. The method of claim 1 further comprising:
    automatically identifying, by the system, that
        (i) the second recipient was previously participating in a second instant focus group with a third recipient, and
        (ii) the second recipient is currently participating in the first instant group.

5. The method of claim 4 further comprising:
    adding, by the system, the third recipient to the first instant focus group based on automatically identifying that:
        (i) the third recipient was previously participating in the second instant focus group,
        (ii) the third recipient is not currently participating in the first instant focus group, and
        (iii) the second recipient is currently participating in the first instant group.

6. The method of claim 4 further comprising:
    transmitting, by the system, a second message to the third recipient based on a label specified in a second sub-expression of the first communications flow expression;
    wherein the second message notifies the third recipient that the third recipient is being added to the first instant focus group with the second recipient.

7. The method of claim 1 wherein the first recipient can selectively participate in the first instant focus group.

8. The method of claim 1 wherein the first recipient can select a subset of responses received by the system for delivery to other recipients in the first instant focus group.

9. The method of claim 1 wherein the first communications flow expression also comprises a second sub-expression;
  wherein the second sub-expression comprises a second primitive keyword for removing a third recipient from the first instant focus group; and
  wherein the third recipient is removed from the first instant focus group based on the fact that the first response comprises an identifier of the third recipient.

10. The method of claim 1 wherein the system determines that the first recipient desires to be included in the first instant focus group when a second primitive keyword of the first sub-expression evaluates to a binary value of true after the parameter of the first sub-expression is replaced with the index number of the first response.

11. An apparatus comprising:
  a hardware memory; and
  a hardware processor, coupled to the hardware memory, operative to receive a first communications flow expression from a sender, wherein the first communications flow expression comprises:
    (i) a first primitive keyword, and
    (ii) a first sub-expression;
  broadcast, based on the first primitive keyword, a first message to a plurality of recipients, wherein the first message is broadcasted to:
    (i) a first recipient in the plurality of recipients, and
    (ii) a second recipient in the plurality of recipients;
  receive:
    (i) a first response to the first message from the first recipient, and
    (ii) a second response to the first message from the second recipient;
  replace a parameter of the first sub-expression with an index number of the first response to determine whether the first recipient desires to be included in a first instant focus group;
  determine that the first recipient desires to be included in the first instant focus group after the parameter of the first sub-expression is replaced with the index number of the first response;
  generate a second communications flow expression as a result of the determination; and
  transmit the second response to the first recipient based on the second communications flow expression.

12. The apparatus of claim 11 wherein the first communications flow expression also comprises a second sub-expression that is executed by the processor to adjust a third recipient's membership in a communications flow, and wherein:
  (i) the first recipient is a member of the communications flow, and
  (ii) the second recipient is a member of the communications flow.

13. The apparatus of claim 11 wherein the first communications flow expression also comprises a second sub-expression;
  wherein the second sub-expression comprises a second primitive keyword that is executed by the processor to add a third recipient to the first instant focus group; and
  wherein the third recipient is added to the first instant focus group based on the fact that the first response comprises an identifier of the third recipient.

14. The apparatus of claim 11 wherein the processor is further operative to:
  automatically identify that:
    (i) the second recipient was previously participating in a second instant focus group with a third recipient, and
    (ii) the second recipient is currently participating in the first instant group.

15. The apparatus of claim 14 wherein the processor is further operative to:
  add the third recipient to the first instant focus group based on automatically identifying that:
    (i) the third recipient was previously participating in the second instant focus group,
    (ii) the third recipient is not currently participating in the first instant focus group, and
    (iii) the second recipient is currently participating in the first instant focus group.

16. The apparatus of claim 14 wherein the processor is further operative to:
  transmit a second message to the third recipient based on a label specified in a second sub-expression of the first communications flow expression;
  wherein the second message notifies the third recipient that the third recipient is being added to the first instant focus group with the second recipient.

17. The apparatus of claim 11 wherein the first recipient can selectively participate in the first instant focus group.

18. The apparatus of claim 11 wherein the first recipient can select a subset of responses for delivery to other recipients in the first instant focus group.

19. The apparatus of claim 11 wherein the first communications flow expression also comprises a second sub-expression;
  wherein the second sub-expression comprises a second primitive keyword that is executed by the processor to remove a third recipient from the first instant focus group; and
  wherein the third recipient is removed from the first instant focus group based on the fact that the first response comprises an identifier of the third recipient.

20. The apparatus of claim 11 wherein the processor determines that the first recipient desires to be included in the first instant focus group when a second primitive keyword of the first sub-expression evaluates to a binary value of true after the parameter of the first sub-expression is replaced with the index number of the first response.

* * * * *